United States Patent Office 3,341,538
Patented Sept. 12, 1967

3,341,538
CERTAIN 2,6-METHANO-3-BENZAZOCINES
Fred B. Block, Hartsdale, and Frank H. Clarke, Jr., Armonk, N.Y., assignors to Geigy Chemical Corporation, Greenburgh, N.Y., a corporation of Delaware
No Drawing. Filed June 18, 1965, Ser. No. 465,143
31 Claims. (Cl. 260—247.2)

This application is a continuation-in-part of copending application Ser. No. 332,296, filed Dec. 20, 1963.

This invention relates to novel organic compounds, to novel methods for the use of such compounds, to novel processes for their preparation and to novel intermediates employed in these processes. In particular, the present invention pertains to 3-substituted 2,6-methano-3-benzazocines having useful and unexpected pharmacological properties. These compounds may be represented by the formula:

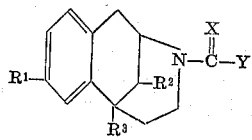

in which
X is O, S or NH,
Y is —OR⁴, —SR⁵ or

$R_1$ is hydrogen, hydroxy, (lower)alkoxy or (lower)alkanoyloxy,
$R^2$ is hydrogen or (lower)alkyl,
$R^3$ is hydrogen, (lower)alkyl, β-methoxyethyl, phenyl or substituted phenyl,
each of $R^4$ and $R^5$ is (lower)alkyl, (lower)alkenyl, phenyl or phenyl(lower)alkyl and
each of $R^6$ and $R^7$ is hydrogen, (lower)alkyl, (lower)alkenyl, phenyl, substituted phenyl or when $R^6$ and $R^7$ are taken together, alkylene of from 2 to 7 carbon atoms inclusively or ethyleneoxyethyl.

The benzazocine nucleus is numbered as follows in accordance with Chemical Abstracts, 50, 1512S (1956):

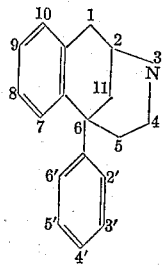

This numbering will be used hereinafter and in the appended claims. 2′ is ortho; 3′ is meta; and 4′ is para.

Alternative numbering and nomenclature have become established and are used in the art. Mention is made of the use of the term 6,7-benzomorphan and of the following numbering (Merck Index, seventh ed., p. 134) (1960):

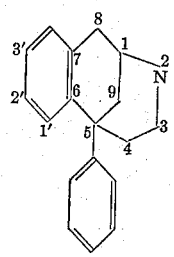

The compounds of this invention are non-toxic analgesics having an activity of the same order of magnitude as codeine or morphine. Many of these compounds are surprisingly free of addictive properties in contrast to morphine and known 2,6-methano-3-benzazocines. Certain of the benzomorphans of this invention are also valuable antitussive agents. Several are also antagonists of morphine.

These compounds may be administered parenterally or orally in any of the usual pharmaceutical forms including tablets, capsules, powders, suspensions, solutions, syrups and the like. Particularly valuable formulations include sustained release preparations which may be compounded by any of the known procedures.

By the term "(lower)alkyl" and derivations thereof such as "(lower)alkoxy," "(lower)alkanoyloxy," "(lower)alkenyl" and the like is intended a group comprising a branched or straight hydrocarbon chain containing from one to six carbon atoms. Representative of (lower)alkyl groups are thus methyl, ethyl, propyl, isopropyl, butyl, s-butyl, t-butyl, pentyl, isopentyl, hexyl and the like. Embraced by (lower)alkoxy are groups containing from one to six carbon atoms and joined through an oxygen ether bond such as methoxy, ethoxy, isopropoxy, butoxy and the like. It is to be understood that when the nature of any particular functional group in these moieties requires two carbon atoms, such as an olefinic bond in an alkenyl group, the hydrocarbon portion of the designated moiety will have from two to seven carbon atoms. Thus "(lower)alkenyl" includes vinyl, allyl, 2-methyl, 2-methyl-2-butenyl, isopropenyl, 1,3-butadienyl, 2-pentenyl and the like.

With greater particularity to Formula I, the benzo portion of the fundamental nuclei of these benzazocines is either unsubstituted, or substituted in the 8-position by the hydroxy group or a derivative thereof such as an ether or ester; i.e., $R^1$ is (lower)alkoxy or (lower)alkanoyloxy respectively.

The benzazocines of the present invention are either unsubstituted in the 6-position or substituted by (a) a (lower)alkyl group such as the 6-isopropyl-2,6-methano-3-benzazocines, 6-methyl-2,6-methano-3-benzazocines and the like; (b) the β-methoxyethyl group; or (c) a phenyl group, including substituted phenyl groups. 6-phenyl-2,6-methano-3-benzazocines are described and claimed in the copending application of Frank H. Clarke, Jr., Ser. No. 322,063, filed Nov. 7, 1963, now abandoned, and continuation application thereof, Ser. No. 593,326, filed Nov. 10, 1966. Therein they are named 5-phenylbenzomorphans. Typical of such 6-phenyl-2,6-methano-3-benzazocines are those of the formula:

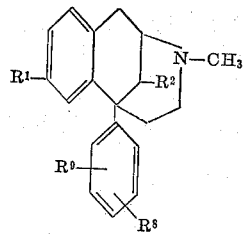

II in which each of $R^8$ and $R^9$ is hydrogen, halogen, (lower)alkyl, (lower)alkoxy, (lower)alkanoyloxy, hydroxy or trifluoromethyl,
$R^1$ is hydrogen, hydroxy, (lower)alkoxy or (lower)alkanoyloxy and
$R^2$ is hydrogen or (lower)alkyl.

The following compounds are representative of the 6-phenyl-2,6-methano-3-benzazocines of Formula II without limiting the same:

1,2,3,4,5,6 - hexahydro - 3 - methyl - 6 - phenyl - 2,6-methano - 3 - benzazocine - 8 - ol 6 - (4' - chlorophenyl) 1,2,3,4,5,6 - hexahydro - 2,6 - methano - 3 - benzazocine-8-ol.

8 - acetoxy - 1,2,3,4,5,6 - hexahydro - 3 - methyl - 6 - phenyl-2,6-methano-3-benzazocine.

8 - methoxy - 1,2,3,4,5,6 - hexahydro - 3 - methyl - 6 - phenyl-2,6-methano-3-benzazocine.

1,2,3,4,5,6-hexahydro-8-methoxy-6-(4'-methoxyphenyl)-2,6-methano-3-benzazocine.

1,2,3,4,5,6-hexahydro-6-(4'-hydroxyphenyl)-3-methyl-2,6-methano-3-benzazocine-8-ol.

6-(3',4'-Dimethoxyphenyl)-1,2,3,4,5,6-hexahydro-8-methoxy-3-methyl-2,6-methano-3-benzazocine.

1,2,3,4,5,6-hexahydro-8-methoxy-3-methyl-6-(3'-trifluoromethylphenyl)-2,6-methano-3-benzazocine.

1,2,3,4,5,6-hexahydro-3-methyl-6-(4'-methylphenyl)-2,6-methano-3-benzazocine-8-ol.

The preparation of such 2,6-methano-2-benzazocines which serve as intermediates for the synthesis of corresponding compounds of the present invention, is more fully described hereafter.

The 2,6-methano-3-benzazocines of the present invention are either unsubstituted in the 11 position ($R^2$) or substituted by a (lower)alkyl group. When so substituted and when additionally substituted in the 6-position, stereoisomerism is also possible giving rise to cis and trans forms. Both such forms are envisioned as being within the scope of the present invention.

Those compounds of the present invention exhibiting an carboxy moiety ($X=O$, $Y=OR^4$) on the nitrogen atom in the 3-position of the benzazocine nucleus are urethanes of the formula:

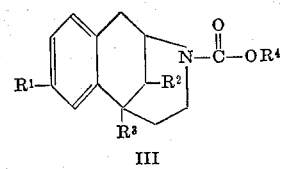

III

Urethanes of Formula III are prepared by treating a 3-methyl or 3-desmethyl 2,6-methano-3-benzazocine with the appropriate chloroformate:

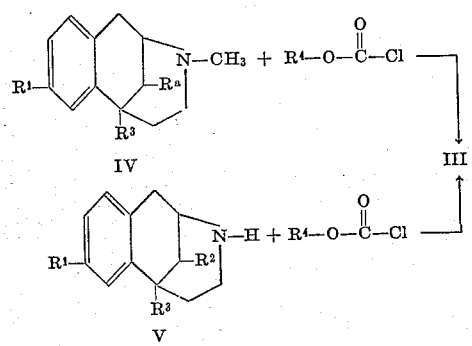

Those compounds of the present invention exhibiting an amide moiety $$\left(X=O, Y=N\begin{matrix}R^6\\R^7\end{matrix}\right)$$

on the nitrogen atom in the 3-position of the benzazocine nucleus are ureas of the formula:

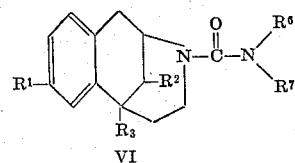

VI

The ureas of Formula VI may be prepared by treatment of a urethane of Formula III where $R^4$ is phenyl with an appropriate amine:

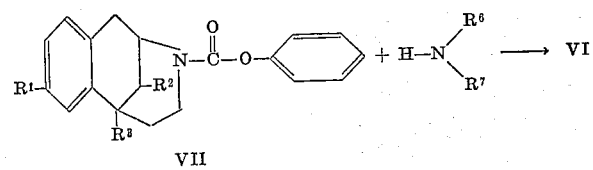

VII

When in Formula VI both $R^6$ and $R^7$ are hydrogen, the desired compounds may be obtained by treatment of a 3-cyano-2,6-methano-3-benzazocine with dilute aqueous acid or with hydrogen peroxide under basic conditions:

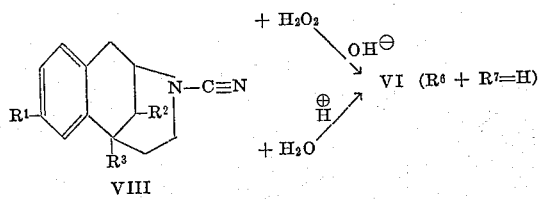

VIII

The novel process for the conversion of cyanamides to ureas through the use of hydrogen peroxides has broad utility beyond its application to the compounds of this invention. Thus it is a general reaction type applicable to the preparation of any urea from the corresponding cyano compound.

Alternatively the thioureas of the present invention, more fully described hereafter, can be converted to the ureas of this invention by treatment with mercuric oxide.

These ureas may also be prepared by treatment of a 3-unsubstituted 2,6-methano-3-benzazocine with an isocyanate, as for example, a phenyl isocyanate.

Those compounds of the present invention exhibiting a thiolcarbonate moiety ($X=O$, $Y=SR^5$) on the nitrogen atom in the 3-position of the 2,6-methano-3-benzazocine nucleus are thiolurethanes of the formula:

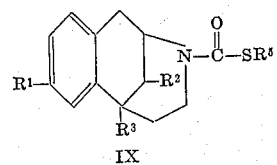

IX

These thiolurethanes are prepared from a compound of the Formula V by treatment with carbonyl sulfide under alkaline conditions followed by treatment with a (lower) alkyl or alkenyl halide, such as chloride or bromide, under basic conditions:

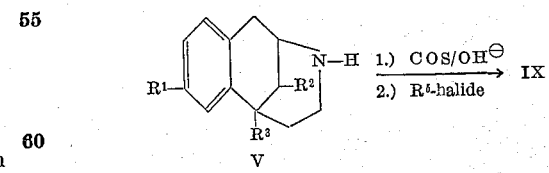

V

Alternatively the compounds of Formula V may be treated with a thiolchloroformate to yield IX.

Those compounds of the present invention exhibiting an oxythiocarbonyl moiety ($X=S$, $Y=OR^4$) on the nitrogen atom in the 3-position of the 2,6-methano-3-benzazocine nucleus are thionocarbamates of the formula:

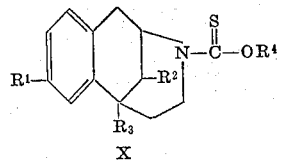

X

Thionocarbamates of Formula X are prepared from a 2,6-methano-3-benzazocine unsubstituted in the 3-position by treatment with the appropriate xanthogenacetic acid:

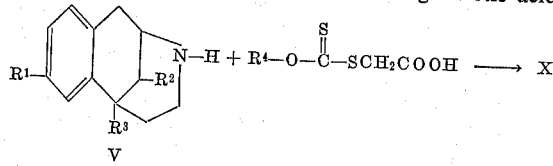

The requisite xanthogenacetic acid reagents may be prepared according to the procedure of Biilmann, Ann., 339, 355.

Alternatively the compounds of Formula X may be prepared by treating the 3-unsubstituted 2,6-methano-3-benzazocines of Formula V with a thionochloroformate.

Those compounds of the present invention exhibiting a dithioate moiety ($X=S$, $Y=SR^5$) on the nitrogen atom in the 3-position of the 2,6-methano-benzazocine nucleus are dithiocarbamates of the formula:

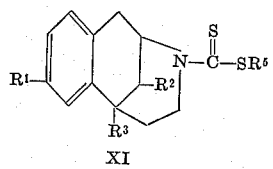

Compounds of Formula XI are prepared by treating a 3-unsubstituted 2,6-methano-3-benzazocine with carbon disulfide and alkali followed by treatment of the dithioic acid salt thus formed with an alkyl or alkenyl halide such as a chloride or bromide.

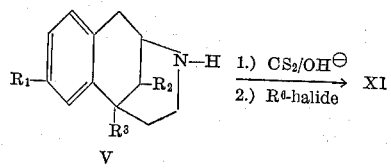

Those compounds of the present invention exhibiting a thioamide (or thiocarbamyl) moiety

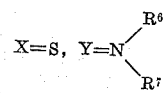

on the nitrogen atom in the 3-position of the 2,6-methano-3-benzazocine nucleus are thioureas of the formula:

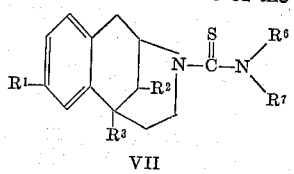

Thioureas of Formula XII are prepared according to the present invention by treating a 3-unsubstituted 2,6-methano-benzazocine of Formula V with the appropriate isothiocyanate. Alternatively when $R^6$ and $R^7$ are both hydrogen, ammonium thiocyanate may be employed. In addition a 3-cyano-2,6-methano-3-benzazocine may be treated with hydrogen sulfide to obtain the thioureas of Formula XII where $R^6$ and $R^7$ are hydrogen.

Those compounds of the present invention exhibiting an iminoester moiety ($X=NH$, $Y-OR^4$) on the nitrogen atom in the 3 position of the 2,6-methano-3-benzazocine nucleus are isoureas of the formula:

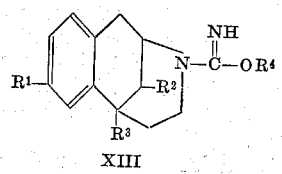

Isoureas of Formula XIII are prepared as the acid salts by treating a 3-cyano-2,6-methano-3-benzazocine with a molar equivalent of the appropriate alcohol and a molar equivalent of a mineral acid such as hydrochloric acid. The free base may be obtained by treatment with base if desired.

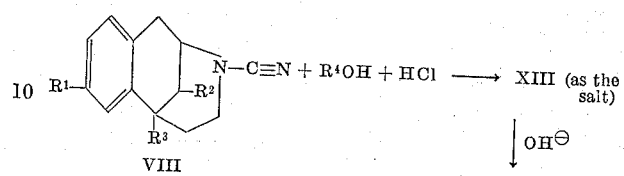

Those compounds of the present invention exhibiting an iminothioester moiety ($X=NH$, $Y=SR^5$) on the nitrogen atom in the 3 position of the 2,6-methano-3-benzazocine nucleus are isothioureas of the formula:

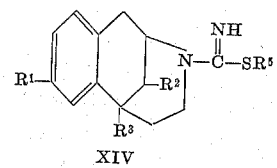

Compounds of Formula XIV are prepared by treating a thiourea of Formula XIIa in which $R^6$ and $R^7$ are both hydrogen with a (lower)alkyl or alkenyl halide, preferably an iodide.

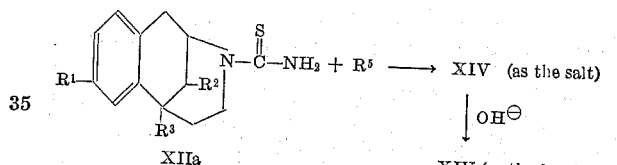

Those compounds of the present invention exhibiting a guanyl moiety $$\left(X=NH,\ Y=N\begin{matrix}R^6\\R^7\end{matrix}\right)$$

on the nitrogen atom in the 3-position of the 2,6-methano-3-benzazocine nucleus are guanidines of the formula:

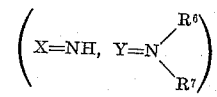

These guanidines are prepared by treating a 3-cyano-2,6-methano-3-benzazocine with the appropriate amine.

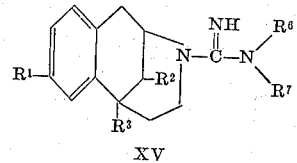

When $R^6$ and $R^7$ are both hydrogen, guanidines of Formula XV may be prepared by treating a 3-unsubstituted 2,6-methano-3-benzazocine of Formula V with cyanamide.

In each of Formulae III through XV, $R^1$, $R^2$, $R^3$, $R^4$, $R^5$, $R^6$ and $R^7$ are as above defined. In certain instances where a group embraced by these designations is adversely affected by the particular reaction conditions, as for example, the hydroxy group, it may be protected through formation of an appropriate protective group e.g., the acetoxy group. When groups such as ester groups are desired in the final compounds and the synthetic route fosters hydrolysis of such groups, esterification of a hydroxy group may be performed after the execution of the hydrolytic step.

Particularly valuable and novel intermediates in the above procedures are the 3-cyano-2,6-methano-3-benzazocines of Formula VIII. These compounds, which in addition to their value as intermediates are also useful analgetic compounds in their own right, are prepared by treating a 3-methyl-2,6-methano-3-benzazocine of Formula IV with cyanogen bromide.

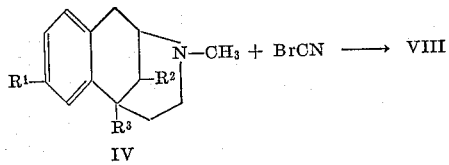

IV

By reduction of such 3-cyano-2,6-methano-3-benzazocines, as with lithium aluminum hydride, there is obtained the 3-unsubstituted 2,6-methano-3-benzazocines of Formula V.

Several of the intermediates of Formula IV are known to the art. Those which are novel may be prepared by cyclization of a compound of the formula:

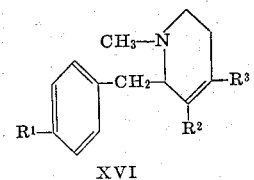

XVI with a strong mineral acid such as hydrobromic or phosphoric acid. Alternatively a Lewis acid such as aluminum bromide or aluminum chloride may be used in this cyclization step employing the compound of Formula XVI as a hydrohalide salt e.g., hydrochloride. This method offers advantages in certain instances, particularly when production of one isomeric form is preferred over production of the other. In addition, the use of a Lewis acid with the hydrochloride of Formula XVI permits maintenance of alkoxy group, as for example $R^1$ and/or $R^8$ and $R^9$ when $R^3$ is a substituted phenyl group as Formula II. When hydrobromic acid is used to effect cyclization, alkoxy or alkanoyloxy groups may be hydrolysized to a hydroxy group. Such hydroxy groups may however, be re-etherified or re-esterified at a later stage in the synthetic route if desired.

The requisite intermediates of Formula XVI may be prepared by treating a substituted tetrahydropyridine of Formula XVII with a benzyl halide, preferably a benzyl chloride to yield the quaternary salt of Formula XVIII. Upon treatment with a strong base such as phenyl lithium, butyl lithium, potassium hydroxide or sodium hydroxide, this quaternary salt rearranges to form the compounds of Formula XVI.

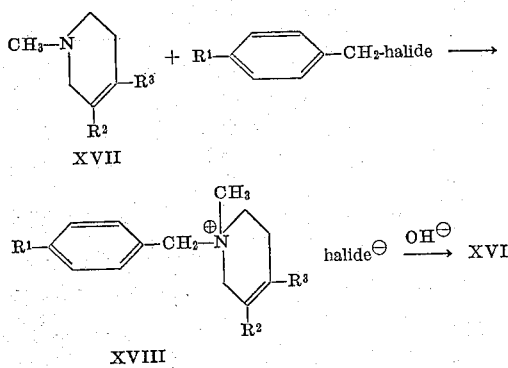

When $R^3$ is phenyl or substituted phenyl, the compounds of Formula XVII may be prepared by treatment of a piperidone of Formula XIX with a phenyl lithium compound (XX) or a phenyl magnesium halide (XXI).

The resultant product XXII in either case is dehydrated by standard methods to yield the requisite intermediate.

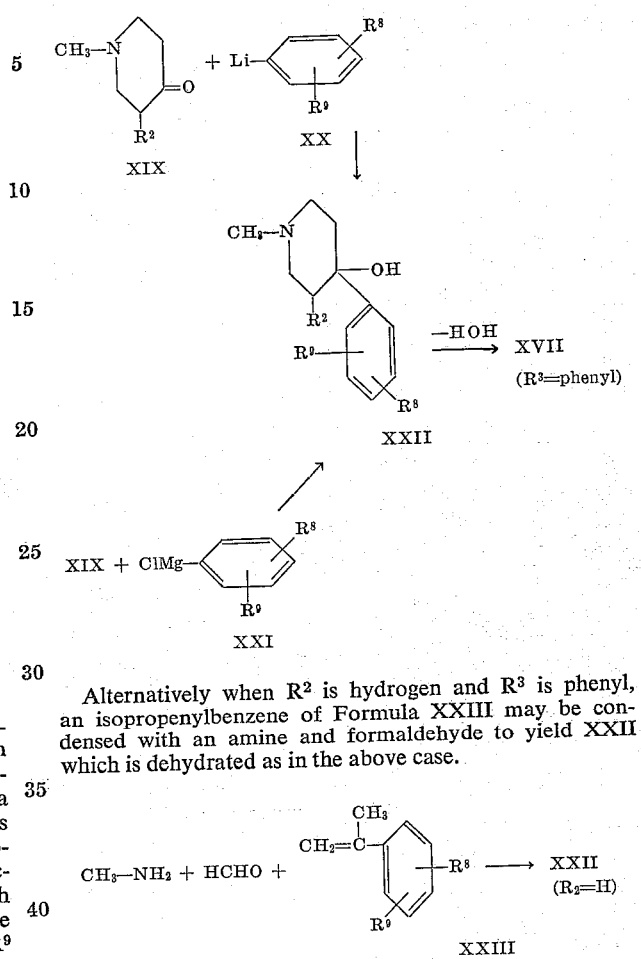

Alternatively when $R^2$ is hydrogen and $R^3$ is phenyl, an isopropenylbenzene of Formula XXIII may be condensed with an amine and formaldehyde to yield XXII which is dehydrated as in the above case.

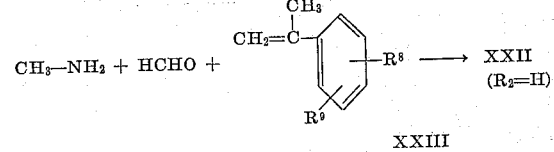

Since the 2,6-methano-3-benzazocines of the present invention possess at least one "asymmetric" carbon atom, optical isomers are possible. Such isomers are prepared by resolution of a starting material such as the compounds of Formulae IV or V with an optically active acid such as camphorsulfonic acid and subsequent generation of the optically active base. This base is then treated as described herein to obtain the optically active final compounds of this invention. All such isomers including optical isomers of each of the cis (or α) and trans (or β) stereoisomeric forms and including racemates of the foregoing are included within the scope of the present invention.

In certain instances as when X in Formula I is NH, salts of the compounds of this invention are possible. Such salts, particularly those which are non-toxic and pharmaceutically acceptable, are considered as but another embodiment of the invention.

The biologically active compounds of this invention which, as will be noted, may exist in isomeric forms may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosage of morphine, and these compounds are useful to treat the types of conditions often treated with morphine. Because of their great analgesic activity, it is sometimes possible to use dosages of these compounds which are lower than those of morphine.

For oral administration the compounds may be administered in the form of tablets containing excipients such as starch or milk sugar. Aqueous suspensions and elixirs which may be sweetened or flavored may also be used. For intra-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

The present invention contemplates, in one of its embodiments especially useful 3-carbamyl-2,6-methanol-3-benzazocines. These are, in essence, (a) compounds of the formula:

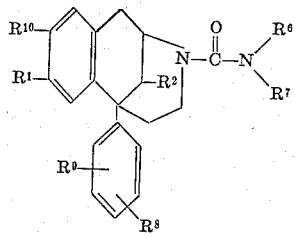

wherein $R^1$ is hydrogen, hydroxy, (lower)alkoxy, (lower)alkanoyloxy, amino(lower)alkanoyloxy, carboxy(lower)alkanoyloxy, carboxybenzoyloxy, or nicotinyloxy, $R^2$ is hydrogen or (lower)alkyl, each of $R^6$ and $R^7$ is hydrogen, (lower)alkyl, (lower)alkenyl, phenyl, (lower)alkylphenyl, (lower)alkoxyphenyl, chlorophenyl, bromophenyl, hydroxyphenyl, trifluoromethylphenyl, phenyl(lower)alkyl, or di(lower)alkylamino(lower)alkylene and when $R^6$ and $R^7$ are taken together alkylene of from 2 to 7 carbon atoms or ethyleneoxyethyl, each of $R^8$ and $R^9$ is hydrogen, halogen, (lower)alkyl, (lower)alkoxy, (lower)alkanoyloxy, hydroxy or trifluoromethyl, and $R^{10}$ is hydrogen, $SO_3H$, di(lower)alkylamino(lower)alkylene, piperidino (lower)alkylene or morpholino (lower) alkylene, and (b) non-toxic addition salts of bases thereof with acids and non-toxic addition salts of acids thereof with bases. As will readily be apparent to those skilled in the art, only certain members of the above compounds will form acid- and base-addition salts. Certain groups are conducive to the formation of such salts; illustrative of these are carboxy(lower)alkanoyloxy, for example, hemisuccinate, carboxybenzoyloxy, for example, hemiphthalate, and $SO_3H$. These, when attached to the neutral 3-carbamyl-2,6-methano-3-benzazocine nucleus furnish a reactive group to permit formation of addition salts with bases such as ethylenediamine, potassium hydroxide, sodium hydroxide, and the like. Illustrative of groups which, when attached to the neutral 3-carbamyl-2,6-methano-3-benzazocine nucleus, furnish a reactive group to form non-toxic addition salts with acids are: nicotinyloxy, for example, 3-nicotinyloxy, amino(lower)alkanoyloxy, for example, N,N-dimethylaminopropenoxy, and di(lower)alkylamino(lower)alkylene, for example, N',N'-diethylaminoethyl. These react with and form useful salts derived from organic and inorganic acids, such as hydrochloric, hydrobromic, sulfuric, phosphoric, methanesulfonic, acetic, lactic, succinic, malic, aconitic, phthalic, tartaric, and the like. The above-contemplated salts are especially useful to prepare soluble pharmaceutical dosage forms. In addition, certain of them are more rapidly absorbed systemically than the neutral compounds, permitting quicker onset of action and higher blood levels.

Special mention is made of particularly valuable 3-carbamyl-2,6-methano - 3 - benzazocines having substituted thereon groups conducive to the formation of acid or base addition salts. These are:

3-carbamyl-1,2,3,4,5,6 - hexahydro-6-phenyl-2,6-methano-3-benzazocine-8-ol 9-sulfonic acid;

3-carbamyl-1,2,3,4,5,6 - hexahydro-8-(3-nicotinyloxy)-6-phenyl-2,6-methano-3-benzazocine;

3-carbamyl-1,2,3,4,5, 6 -hexahydro-6 - phenyl-2,6-methano-3-benzazocine-8-ol 8-hemisuccinate;

3-carbamyl-1,2,3,4,5,6 - hexahydro-6 - phenyl-2,6-methano-3-benzazocine-8-ol 8-hemiphthalate;

3-carbamyl-8-(N,N-dimethylaminopropenoxy) - 1,2,3,4, 5,6-hexahydro-6-phenyl-2,6-methano-3-benzazocine;

9-dimethylaminomethyl-3 - (N-butyl-N',N' - dimethylaminocarbamyl)-1,2,3,4,5,6-hexhydro-6-phenyl-2,6 - methano-3-benzazocine; and 3-(N-butyl-N',N'-dimethylaminocarbamyl) - 1,2,3,4,5, 6-hexahydro-6-phenyl-2,6-methano-3-benzazocine-8-ol.

Procedures for attaching the acid- and base-reacting groups to the 3-carbamyl-2,6-methano-3-benzazocine nucleus are exemplified in detail hereinafter. Generally, the sulfonic acid, $SO_3H$, group is introduced with facility simply by heating the appropriate benzazocine with concentrated sulfuric acid and recovering the product after pouring the reaction mixture into water. The nicotinyloxy group is readily introduced by heating an appropriate 3-carbamyl-2,6-methano-3-benzazocine-8-ol with nicotinyl chloride, preferably in the presence of an acid-binding agent such as pyridine, until esterification is substantially complete, then recovering the product, such as evaporating the reaction mixture, then purifying it, if desired, such as by recrystallization. The amino(lower)alkanoyloxy group is introduced by heating an amino(lower)alkanoylhalide with an appropriate 3-carbamyl-2,6-methano-benzazocine-8-ol, preferably in the presence of an acid binding agent, for example pyridine, until formation of the aminoacid ester is substantially complete and recovering the desired product by evaporation of the reaction mixture and, if desired, purifying it by recrystallization. The carboxy(lower)alkanoyloxy group can be introduced by heating an appropriate 3-carbamyl-2,6-methano-3-benzazocine-8-ol with an anhydride, such as succinic anhydride, preferably in the presence of an agent such as pyridine until condensation is substantially complete and recovering the product after acidification. The same technique is useful to prepare the instant carboxybenzoyloxy-substituted compounds using an appropriate anyhydride, such as phthalic anhydride. To prepare the di(lower) alkylamino-(lower)alkylene substituted compounds, the appropriate 3-carbamyl-2,6-methano - 3 - benzazocine is heated with formaldehyde and di-(lower)alkylamine until condenastion is substantially complete, then the reaction mixture is evaporated and the product is recovered from the residue. The instant di(lower)alkylamino(lower) alkylene-substituted compounds bearing the said substituent on the amido functional group are prepared by treating a 3(H) 2,6-methano-3-benzazocine first with phosgene and then with an appropriately substituted alkyl-amino-N',N'-dialkylaminoalkylenediamine. The product is recovered by evaporating the reaction mixture and is recrystallized, if desired.

The following examples, presented for illustration and not limitation, will further serve to typify the nature of this invention.

EXAMPLE 1

8-acetoxy-3-cyano-1,2,3,4,5,6-hexahydro-6-phenyl-2,6-methano-3-benzazocine (a) 1-methyl-4-phenyl-1,2,5,6-tetrahydropyridine.—An ethereal solution of 76.5 g. (0.675 mole) of redistilled 1-methyl-4-piperidone is added with stirring over 45 minutes to an ice-cooled benzene-ethereal solution containing 0.74 mole of phenyl lithium. The reaction mixture is maintained below 10° during addition and then allowed to attain room temperature with stirring continued for two hours after addition is complete. At the end of this time, the mixture is poured into 500 ml. of ice water with stirring. Chloroform is added and the mixture heated gently until all solid is dissolved. The organic layer is separated, dried over sodium sulfate and evaporated to an oil. While this oil may be allowed to solidify to yield 1-methyl-4-phenyl-4-hydroxypiperidine, M.P. 107–110° C. after trituration with pentane, it may be employed directly in the next step without further purification. Thus the oil is dissolved in 215 ml. of conc. hydrochloric acid and this acidic solution heated at reflux temperature for two hours with stirring to prevent superheating. At the end of this time, the solution is cooled and poured into an ice cold aqueous solution of 170 g. of sodium hydroxide. This reaction mixture is then extracted with chloroform and the extracts dried over sodium sulfate. After removing the solvents by evaporation, the oil which is obtained is distilled in vacuo to yield the intermediate product 1-methyl-4-phenyl-1,2,5,6-tetrahydropyridine, B.P. 103–114° C./0.9 mm.

Alternately this product may be obtained by use of phenyl magnesium bromide in place of phenyl lithium.

(b) *1-methyl-1-(4-methoxybenzyl) - 4 - phenyl-1,2,5,6-tetrahydropyridinium chloride.*—Ninety grams (.58 mole) of p-methoxybenzyl chloride in 50 ml. of acetone are added in a dropwise fashion to a stirred solution of 78 g. (.45 mole) of 1-methyl-4-phenyl-1,2,5,6-tetrahydropyridine in 350 ml. of acetone at reflux. The mixture is heated at reflux with stirring for two hours, at the end of which time the solid which has formed is collected from the cooled solution. This solid is washed with acetone and thoroughly dried in vacuo to yield the quaternary salt with apparently variable melting points, e.g., 119–126°, 123–126° and 167–170° C. for three separate preparations. All such material however can be employed in the following procedure without adverse effect on yield or purity.

The requisite p-methoxybenzylchloride is obtained by treating a benzene solution of anisyl alcohol with anhydrous hydrogen chloride with cooling until the solution is saturated. After stirring for two hours, the aqueous layer is removed and the organic layer stirred for one hour with anhydrous sodium sulfate. The drying agent is then removed by filtration and the solvent and hydrogen chloride are removed by flash evaporation. The product can be used in the above procedure without further purification.

(c) *1 - methyl-2-(4-methoxybenzyl)-4-phenyl-1,2,5,6-tetrahydropyridine.*—An ethereal suspension of 165 g. (1.05 mole) of the quaternary salt obtained in part (b) of this example is treated under nitrogen with 635 ml. (.98 mole) of a 1.56 N ethereal solution of butyl lithium. The butyl lithium is added slowly over a period of one hour, the reaction mixture being stirred during the addition. At the end of this time, the reaction mixture is refluxed for two hours, cooled and poured into one liter of cold water. The ethereal layer is separated and extracted with a solution of 100 ml. of conc. hydrochloric acid in one liter of water. The aqueous extracts together with the oily precipitate are then rendered alkaline by the addition of 200 ml. of conc. aqueous ammonia. The precipitated base is taken up in ether and the solution thus obtained dried over sodium sulfate. The drying agent is removed by filtration and the solvent by evaporation to yield 1-methyl-2-(4-methoxybenzyl)-4-phenyl-1,2,5,6-tetrahydropyridine which is further purified by distillation at 135–225° C./2 mm.

The distillate is converted to the hydrobromide by the cautious addition of anhydrous hydrogen bromide to a cold acetone solution of the base. Collection of the solid thus formed and recrystallization yields the hydrobromide salt, M.P. 170–172° C.

In a similar fashion the hydrochloride salt is obtained by employing anhydrous hydrogen chloride in place of hydrogen bromide. This salt has a melting point of 119–124° C.

Alternatively 1-methyl-2-(4-methoxyphenyl)-4-phenyl-1,2,5,6-tetrahydropyridine is obtained in the following manner. A mixture of 33 g. of the quaternary salt obtained in part (b) of this example and 6.0 g. of powdered potassium hydroxide is stirred at reflux with 300 ml. of benzene for two hours. The solids are then removed by filtration and the filtrate is acidified with an ethereal solution of anhydrous hydrogen bromide. The hydrobromide salt thus obtained is recrystallized from ethanol-ether to give colorless crystals, melting point as above.

Alternatively acetone may be used in place of benzene in the above example. After 30 minutes of stirring at reflux, the solution is acidified with anhydrous hydrogen chloride, filtered to remove inorganic compounds, and evaporated to dryness in vacuo. The residue is triturated with ether to remove polymers of acetone and again evaporated to dryness. The residue may be cyclized directly using 48% hydrobromic acid as described in part (d) of this example below.

(d) *1,2,3,4,5,6 - hexahydro - 3 - methyl-6-phenyl-2,6-methano-3-benzazocine-8-ol.*—A solution of 32.7 g. of 1-methyl - 2 - (4-methoxybenzyl)-4-phenyl-1,2,5,6-tetrahydropyridine hydrobromide in 330 ml. of 48% hydrobromic acid is refluxed for four and one-half hours. At the end of this time, the reaction mixture is cooled and poured into a cold solution of 330 ml. of conc. aqueous ammonia and an equal volume of ice. The solid which forms is collected by filtration and dried to constant weight to yield 1,2,3,4,5,6 - hexahydro-3-methyl-6-phenyl-2,6-methano-3-benzazocine-8-ol, M.P. 2.2–220° C. Recrystallization of this material from methanol raises the melting point to 249–252° C.

Calc. for $C_{19}H_{21}NO$ (279.39): C, 81.69; H, 7.58; N, 5.01.

Found: C, 81.43; H, 7.69; N, 4.71.

The reflux period of this procedure may be increased to as much as 24 hours without appreciable effect on the yield.

(e) *8 - acetoxy - 1,2,3,4,5,6-hexahydro-3-methyl-2,6-methano-3-benzazocine.*—A mixture of 1.68 g. of 1,2,3,4,5,6-hexahydro - 3 - methyl-6-phenyl-2,6-methano-3-benzazocine-8-ol and 8.4 ml. of acetic anhydride is heated at 100° C. for 45 minutes. The solution is then poured into 20 ml. of cold water and after five minutes, an aqueous solution of 50% potassium hydroxide is added in slight excess with cooling. The liberated base is shaken quickly into ether. Drying and evaporation of the ethereal solution, followed by recrystallization from isopropyl ether affords 8 - acetoxy - 1,2,3,4,5,6-hexahydro-3-methyl-2,6-methano-3-benzazocine, M.P. 120–112° C.

Calc. for $C_{21}H_{23}NO_2$ (321.40): C, 78.47; H, 7.21; N, 4.36.

Found: C, 78.18; H, 7.25; N, 4.54.

The free base may be converted to the hydrochloride by dissolving in a minimum volume of absolute ethanol and treating the solution with ethanolic hydrogen chloride until acidic to congo red indicator. The solution is then diluted with 5 volumes of anhydrous ether and allowed to crystallize. There is thus obtained 8-acetoxy-1,2,3,4,5,6-hexahydro-3-methyl - 6-phenyl-2,6-methano - 3-benzazocine hydrochloride as the monohydrate, partial melt at 180–190° C. with a clear melt at 250–253° C.

In a similar fashion by employing acylating derivatives of other (lower) alkanoic acids the corresponding 8-alkanoyloxy compounds can be obtained. For example, by use of propionic anhydride in the above procedure, there is obtained 1,2,3,4,5,6-hexahydro-3-methyl-6-phenyl-8-propionoyloxy-2,6-methano-3-benzazocine.

(f) *8 - acetoxy - 3 - cyano - 1,2,3,4,5,6 - hexahydro - 6-phenyl-2,6-methano-3-benzazocine.*—To a solution of 2.6 g. of cyanogen bromide in 30 ml. of chloroform is added at room temperature a solution of 6.5 g. of 8-acetoxy-1,2,3,4,5,6 - hexahydro - 3 - methyl - 6 - phenyl - 2,6-methano-3-benzazocine in 30 ml. of chloroform over a period of 45 minutes. The solution is refluxed for three hours and then evaporated to dryness in vacuo. The residue is crystallized from ethanol to yield 8-acetoxy-3-cyano - 1,2,3,4,5,6 - hexahydro - 6 - phenyl - 2,6 - methano-3-benzazocine, M.P. 207–209° C.

Calc. for C$_{21}$H$_{20}$N$_2$O$_2$ (332.39): C, 75.88; H, 6.07; N, 8.43.

Found: C, 75.62; H, 6.04; N, 8.46.

EXAMPLE 2

*3-carbamyl-1,2,3,4,5,6-hexahydro-6-phenyl-2,6-methano-3-benzazocine-8-ol*

To a mixture of 9.0 g. of 8-acetoxy-3-cyano-1,2,3,4,5,6-hexahydro-6-phenyl-2,6-methano-3-benzazocine, 9.7 ml. of 30% hydrogen peroxide and 30 ml. of ethanol are added slowly 5.6 ml. of 6 N aqueous sodium hydroxide solution with stirring and external cooling, maintaining the temperature at 35–40°. When addition is complete, the cooling bath is removed and the mixture is stirred at 50–60° for three and one-half hours. The mixture is then cooled and the solid is collected by filtration and washed with water and ethanol to yield 3-carbamyl-1,2,3,4,5,6-hexahydro - 6 - phenyl-2,6-methano - 3 - benzazocine-8-ol. The produce after several recrystallizations from methanol melts at 292–294° C.

Calc. for C$_{19}$H$_{20}$N$_2$O$_2$ (308.37): C, 74.00; H, 6.54; N, 9.09.

Found: C, 73.65; H, 6.30; N, 8.97.

Alternatively, this product is prepared by adding 8-acetoxy - 1,2,3,4,5,6 - hexahydro - 3 - methyl - 6 - phenyl - 2,6-methano-3-benzazocine (1.92 g.) in 30 ml. of chloroform to 0.76 g. of cyanogen bromide in 15 ml. of chloroform over one-half hour with stirring. The solution is refluxed for three hours and then evaporated to dryness in vacuo. The residue and 25 ml. of 6% hydrochloric acid are then refluxed for ten hours. This mixture is filtered hot and the residue dissolved in a minimum volume of methanol and concentrated to one-third its original volume. The solid which crystallizes is collected and dried to yield 3-carbamyl - 1,2,3,4,5,6 - hexahydro - 6 - phenyl - 2,6 - methano-3-benzazocine-8-ol.

EXAMPLE 3

*3-carbethoxy-1,2,3,4,5,6-hexahydro-6-phenyl-2,6-methano-3-benzazocine-8-ol*

(a) *8 - acetoxy - 3 - carbethoxy - 1,2,3,4,5,6 - hexahydro-6-phenyl-2,6-methano-3-benzazocine.*—A solution of 1.5 g. of 8-acetoxy-1,2,3,4,5,6-hexahydro-3-methyl-6-phenyl-2,6-methano-3-benzazocine in 50 ml. of anhydrous benzene is added to a solution of 1.5 g. of ethyl chloroformate in 25 ml. of anhydrous benzene over a period of 45 minutes. The mixture is then refluxed for two hours and stirred for 15 hours. The solution is next filtered, washed with 1 N hydrochloric acid, dried over magnesium sulfate and evaporated to yield 8-acetoxy-2-carbethoxy-1,2,3,4,5,6-hexahydro-6-phenyl-2,6-methano-3-benzazocine.

(b) *3 - carbethoxy - 1,2,3,4,5,6 - hexahydro - 6 - phenyl-2,6-methano-3-benzazocine-8-ol.*—A mixture of 0.8 g. of 8 - acetoxy - 3 - carbethoxy - 1,2,3,4,5,6 - hexahydro-6-phenyl-2,6-methano-3-benzazocine and 40 ml. of 2 N hydrochloric acid is refluxed for 17 hours, cooled and extracted with chloroform. The extracts are evaporated in vacuo and the residue recrystallized from benzene-petroleum ether to give 3-carbethoxy-1,2,3,4,5,6-hexahydro-6-phenyl-2,6-methano-3-benzazocine-8-ol, M.P. 207–208° C.

Calc. for C$_{21}$H$_{23}$NO$_3$: C, 74.75; H, 6.87; N, 4.15.

Found: C, 74.95; H, 6.84; N, 3.92.

In a similar fashion, a solution of 1.7 g. of phenyl chloroformate in 10 ml. of dry benzene is added to a solution of 3.21 g. of 8-acetoxy-1,2,3,4,5,6-hexahydro-3-methyl-6-phenyl-2,6-methano-3-benzazocine in 25 ml. of dry benzene. The solution is refluxed for two hours then cooled, washed with 1 N hydrochloric acid and water, dried over sodium sulfate and evaporated to give 8-acetoxy-3-carbophenoxy - 1,2,3,4,5,6 - hexahydro - 6-phenyl - 2,6 - methano-3-benzazocine.

EXAMPLE 4

*3(N,N-dimethylcarbamyl)-1,2,3,4,5,6-hexahydro-6-phenyl-2,6-methano-3-benzazocine-8-ol*

A mixture of 5.0 g. of 8 - acetoxy - 3 - carbophenoxy-1,2,3,4,5,6 - hexahydro - 6 - phenyl - 2,6 - methano - 3-benzazocine-8-ol and 25 g. of anhydrous dimethylamine is heated at 50° C. in a sealed tube for 12 hours. Upon cooling, the contents of the tube are allowed to evaporate and the residue is crystallized from ethanol to yield 3-(N,N-dimethylcarbamyl) - 1,2,3,4,5,6 - hexahydro - 6-phenyl-2,6-methano-3-benzazocine-8-ol.

In a similar fashion 1,2,3,4,5,6-hexahydro-6-phenyl-3-(N - piperidinylcarbonyl) - 2,6 - methano - 3 - benzazocine-8-ol is prepared by heating a mixture of 5 g. of 8-acetoxy-3 - carbophenoxy - 1,2,3,4,5,6 - hexahydro - 6 - phenyl-2,6-methano-3-benzazocine-8-ol and 25 ml. of anhydrous piperidine at reflux for 12 hours. The reaction mixture is then evaporated and the residue crystallized from ethanol to yield the product.

Likewise 1,2,3,4,5,6 - hexahydro - 3 - (N - morpholinocarbonyl) - 6 - phenyl - 2,6 - methano - 3 - benzazocine - 8-ol is obtained by substituting anhydrous morpholine for piperidine in the above procedure.

EXAMPLE 5

*1,2,3,4,5,6-hexahydro-6-phenyl-3-thiocarbamyl-2,6-methano-3-benzazocine-8-ol*

(a) *8 - acetoxy - 3 - cyano - 1,2,3,4,5,6 - hexahydro-6 - phenyl - 2,6 - methano - 3 - benzazocine.*—To a solution of 2.59 g. (24.4 mmole) of cyanogen bromide in 30 ml. of chloroform are added 6.53 g. (20.3 mmole) of 8 - acetoxy - 1,2,3,4,5,6 - hexahydro - 3 - methyl - 6-phenyl - 2,6 - methano - 3 - benzazocine as the free base. The addition is executed over a 45 minute period at room temperature. The reaction solution is refluxed for three hours and then concentrated in vacuo. The resulting solid is crystallized from acetone until the melting point is constant, M.P. 207–209° C.

(b) *1,2,3,4,5,6 - hexahydro - 6 - phenyl - 2,6 - methano-3 - benzazocine - 8 - ol.*—To a suspension of 5.60 g. of lithium aluminum hydride in 100 ml. of dry tetrahydrofuran under anhydrous conditions are added 5.00 g. of 8-acetoxy - 3 - cyano - 1,2,3,4,5,6 - hexahydro - 6 - phenyl-2,6 - methano - 3 - benzazocine dissolved with the aid of heat in 100 ml. of dry tetrahydrofuran. The mixture is refluxed for 17 hours and then decomposed by the addition of 29 ml. of saturated sodium chloride solution. The resulting mixture is next refluxed one hour and filtered. The filtrate is concentrated in vacuo and the residue is then recrystallized from isopropanol to yield 1,2,3,4,5,6 - hexahydro - 6 - phenyl - 2,6 - methano - 3 - benzazocine - 8-ol, M.P. 239–241° C.

Calc. for C$_{18}$H$_{19}$NO (265.34): C, 81.47; H, 7.22; N, 5.28.

Found: C, 81.49; H, 7.23; N, 5.08.

(c) *1,2,3,4,5,6 - hexahydro - 6 - phenyl - 3 - thiocarbamyl - 2,6 - methano - 3 - benzazocine - 8 - ol.*—A mixture of 5 g. of 1,2,3,4,5,6 - hexahydro - 6 - phenyl - 2,6-methano - 3 - benzazocine - 8 - ol and 5 g. of ammonium thiocyanate is heated until a clear melt is obtained. The melt is allowed to cool and then crystallized from ethanol to give 1,2,3,4,5,6 - hexahydro - 6 - phenyl - 3 - thiocarbamyl - 2,6 - methano - 3 - benzazocine - 8 - ol.

Alternatively, a solution of 5.0 g. of 8 - acetoxy - 3-cyano - 6 - phenyl - 2,6 - methano - 3 - benzazocine in 50 ml. of pyridine is saturated with hydrogen sulfide over eight hours. Removal of the solvent and recrystallization from alcohol then yields the desired product.

EXAMPLE 6

*1,2,3,4,5,6-hexahydro-3-(N-methylthiocarbamyl)-6-phenyl-2,6-methano-3-benzazocine-8-ol*

A solution of 1.0 g. of 1,2,3,4,5,6 - hexahydro - 6 - phenyl-2,6 - methano - 3 - benzazocine - 8 - ol and 0.3 g. of methyl isothiocyanate in 70 ml. of anhydrous tetrahydrofuran is refluxed for 18 hours under anhydrous conditions. The solution is concentrated and cooled whereupon a solid is obtained. Recrystallization of this solid from a mixture of one part ethyl acetate and two parts cyclohexane yields 1,2,3,4,5,6 - hexahydro - 3 - (N - methylthiocarbamyl)-6 - phenyl - 2,6 - methano - 3 - benzazocine - 8 - ol M.P. 263–266° C. Further recrystallization from equal parts of methanol and water raises the melting point to 265–267° C.

Calc. for $C_{20}H_{22}N_2OS$: C, 70.98; H, 6.55; N, 8.28; S, 9.46.

Found: C, 70.92; H, 6.85; N, 8.18; S, 9.41.

EXAMPLE 7

*1,2,3,4,5,6 - hexahydro - 6 - phenyl - 3 - [N - (β - phenylethyl) - thiocarbamyl]2,6 - methano - 3 - benzazocine-8-ol*

A solution of 1.20 g. of 1,2,3,4,5,6 - hexahydro - 6 - phenyl - 2,6 - methano - 3 - benzazocine - 8 - ol and 0.82 g. of β-phenylethylisothiocyanate in 80 ml. of anhydrous tetrahydrofuran is refluxed for three hours and then evaporated to dryness in vacuo. Trituration of the residue with isopropanol yields 1,2,3,4,5,6 - hexahydro - 6-phenyl-3 - [N - (β - phenylethyl) - thiocarbamyl] - 2,6 - methano-3-benzazocine-8-ol, M.P. 234–236° C. The melting point remains unchanged upon recrystallization from ethanol.

Calc. for $C_{27}H_{28}N_2OS$: C, 75.67; H, 6.59; N, 6.45; S, 7.47.

Found: C, 75.30; H, 6.63; N, 6.67; S, 7.46.

EXAMPLE 8

*3-(N-allylthiocarbamyl)-1,2,3,4,5,6-hexahydro-6-phenyl-2,6-methano-3-benzazocine-8-ol*

A solution of 1.00 g. of 1,2,3,4,5,6 - hexahydro - 6-phenyl - 2,6 - methano - 3 - benzazocine - 8 - ol and 0.42 g. of allylisothiocyanate in 65 ml. of anhydrous tetrahydrofuran is refluxed for 18 hours and then evaporated to dryness in vacuo. Trituration of the residue with benzene yields 3-(N-allylthiocarbamyl) - 1,2,3,4,5,6 - hexahydrophenyl-2,6-methano - 3 - benzazocine-8-ol, M.P. 183–189° C. Recrystallization from ethyl acetate raises the melting point to 199–201° C.

Calc. for $C_{22}H_{24}NOS$: C, 72.50; H, 6.64; N, 7.69; S, 8.78.

Found: C, 72.25; H, 6.37; N, 7.65; S, 8.77.

EXAMPLE 9

*8 - acetoxy - 1,2,3,4,5,6 - hexahydro - 6 - phenyl - 3 - [N-(β - phenylethyl) - thiocarbamyl] - 2,6 - methano - 3-benzazocine*

A mixture of 2.0 g. of 1,2,3,4,5,6 - hexahydro - 6-phenyl - 3 - [N - (β - phenylethyl) - thiocarbamyl] - 2,6-methano - 3 - benzazocine - 8 - ol and 20 ml. of acetic anhydride is heated at 100° C. for an hour. The mixture is then poured into 100 ml. of icewater and rendered basic (pH 10) by the addition of sodium hydroxide. The mixture is then extracted with ether and these extracts dried and evaporated to yield the desired 8 - acetoxy - 1,2,3,4,5, 6 - hexahydro - 6 - phenyl - 3 - [N - (β - phenylethyl)-thiocarbamyl] - 2,6 - methano - 3 - benzazocine.

EXAMPLE 10

*8-acetoxy-3-(N-allylthiocarbamyl)-1,2,3,4,5,6-hexahydro-6-phenyl-2,6-methano-3-benzazocine*

A mixture of 2.5 g. of 3-(N-allylthiocarbamyl)-1,2,3,4, 5,6 - hexahydro-6-phenyl-2,6-methano-3-benzazocine-8-ol and 20 ml. of acetic anhydride is heated at 100° C. for one hour. The mixture is then poured into 100 ml. of water, rendered basic with external cooling and extracted with diethylether. The dried ether extracts upon concentration then yield 8-acetoxy-3-(N-allylthiocarbamyl)-1,2, 3,4,5,6-hexahydro-6-phenyl-2,6-methano-3-benzazocine.

EXAMPLE 11

*1,2,3,4,5,6-hexahydro-3-(N-methylcarbamyl)-6-phenyl-2,6-methano-3-benzazocine-8-ol*

A mixture of 5.0 g. of 1,2,3,4,5,6-hexahydro-3-(N-methylthiocarbamyl - 6 - phenyl-2,6-methano-3-benzazocine-8-ol, 25.0 g. of yellow mercuric oxide and 100 ml. of absolute ethanol is stirred at reflux for 24 hours. The insoluble material is then removed by filtration and the filtrate is concentrated to a small volume. Upon cooling and filtration there is obtained 1,2,3,4,5,6-hexahydro-3-(N-methylcarbamyl)-6-phenyl-2,6-methano - 3 - benzazocine-8-ol.

Similarly by employing 1,2,3,4,5,6-hexahydro-6-phenyl-3-[N - (β-phenylethyl)-thiocarbamyl] - 2,6 - methano-3-benzazocine-8-ol in the procedure of this example, there is obtained 1,2,3,4,5,6-hexahydro - 6 - phenyl-3-[N-(β-phenylethyl)-carbamyl]-2,6 - methano - 3 - benzazocine-8-ol.

Likewise 3-(N-allylcarbamyl)-1,2,3,4,5,6-hexahydro-6-phenyl-2,6-methano-3-benzazocine-8-ol is obtained from 3 - (N-allylthiocarbamyl)-1,2,3,4,5,6-hexahydro-6-phenyl-2,6-methano-3-benzazocine-8-ol.

EXAMPLE 12

*1,2,3,4,5,6-hexahydro-6-phenyl-3-(N-phenylcarbamyl)-2-6-methano-3-benzazocine-8-ol*

(a) *1,2,3,4,5,6 - hexahydro - 8 - methoxy-3-methyl-6-phenyl-2,6-methano-3-benzazocine.*—To a solution of 17.2 g. of phenyl trimethyl ammonium chloride in 25 ml. of absolute methanol at 25° C. is added a solution of 2.25 g. of sodium in 25 ml. of absolute methanol. The sodium chloride formed is removed by filtration in the absence of moisture and carbon dioxide. To this solution is added 25.0 g. of 1,2,3,4,5,6-hexahydro-3-methyl-6-phenyl-2,6-methano-3-benzazocine-8-ol in toluene. The mixture is then heated with stirring so as to permit removal of the solvents (100–110° C.). The reaction solution is then cooled, washed with cold, diluted aqueous sodium hydroxide solution and extracted with dilute aqueous hydrochloric caid. The acid extracts are rendered basic by the addition of aqueous ammonia. The solid which forms is dissolved in chloroform and the solution dried over sodium sulfate. Removal of the solvent then yields 1,2,3,4,5,6-hexahydro-8-methoxy-3-methyl-6-phenyl - 2,6-methano-3-benzazocine.

Alternatively, a solution of 24 g. of aluminum tribromide in 100 ml. of carbon disulfide is slowly added with cooling to a stirred suspension of 8.0 g. of the hydrochloride salt of 2-(4-methoxybenzyl)-1-methyl-4-phenyl-1,2,5,6-tetrahydropyridine in 50 ml. of carbon disulfide. When addition is complete, the cooling bath is removed and the mixture stirred at reflux for half an hour. After cooling, the solvent is decanted and the viscous residue is added to a mixture of excess conc. aqueous ammonia, ice and chloroform. This mixture is stirred to decompose all of the aluminum tribromide complex and the chloroform layer is then separated and dried over sodium sulfate. After evaporating the solvent, the residue is triturated with ether, filtered and again evaporated to yield 1,2,3,4,5,6-hexahydro-8-methoxy-3-methyl-6-phenyl-2,6-methano - 3-benzazocine.

(b) *3 - cyano - 1,2,3,4,5,6 - hexahydro-8-methoxy-6-phenyl-2,6-methano-3-benzazocine.*—To a solution of 2.6 g. of cyanogen bromide in 30 ml. of chloroform is added a solution of 6.5 g. of 1,2,3,4,5,6-hexahydro-8-methoxy-3-methyl-6-phenyl-2,6-methano-3-benzazocine in 100 ml. of chloroform over a period of 45 minutes. The resulting solution is refluxed for three hours and the solvent then evaporated to give 3-cyano - 1,2,3,4,5,6 - hexahydro-8-methoxy-6-phenyl-2,6-methano-3-benzazocine. The product is further purified by recrystallization from acetone.

(c) *1,2,3,4,5,6 - hexahydro-8-methoxy-6-phenyl - 2,6-methano-3-benzazocine.*—To a suspension of 5.6 g. of lithium aluminum hydride in 100 ml. of dry tetrahydrofuran is added 5.0 g. of 3-cyano-1,2,3,4,5,6-hexahydro-8-methoxy-6-phenyl-2,6-methano-3-benzazocine in 100 ml. of dry tetrahydrofuran. The mixture is refluxed for 17 hours and then decomposed by the addition of 30 ml. of saturated aqueous sodium chloride solution. The resulting mixture is refluxed for one hour and then cooled. Anhydrous sodium sulfate is added and the mixture is filtered. The filtrate is evaporated to dryness and ether and pentane are then added to yield 1,2,3,4,5,6-hexahydro-8-methoxy-6-phenyl-2,6-methano-3-benzazocine which is collected by filtration and dried.

(d) *1,2,3,4,5,6 - hexahydro - 8 - methoxy-3-(N-phenylcarbamyl)-6 - phenyl-2,6-methano-3-benzazocine.*—A solution of 6.0 g. of phenylisocyanate in 20 ml. of benzene is added slowly to a stirred solution of 14.0 g. of 1,2,3,4,5,6 - hexahydro - 8 - methoxy - 6 - phenyl - 2,6 - methano-3-benzazocine in 100 ml. of benzene. The solution is then refluxed for one hour, concentrated and cooled to yield 1,2,3,4,5,6 - hexahydro - 8 - methoxy - 3 - (N-phenylcarbamyl)-6-phenyl-2,6-methano-3-benzazocine.

In a similar manner by employing 7.2 g. of p-chlorophenylisocyanate in place of the phenylisocyanate there is obtained 3-(N-p-chlorophenylcarbamyl)-1,2,3,4,5,6-hexahydro-8-methoxy-6 - phenyl - 2,6 - methano-3-benzazocine. Similarly other phenylisocyanates such as p-methoxyphenylisocyanate, p - nitrophenylisocyanate, p-methylphenylisocyanate and the like are employed to obtain the correspondingly substituted phenylcarbamyl derivatives of this invention.

EXAMPLE 13

*3-guanyl-1,2,3,4,5,6-hexahydro-6-phenyl-2,6-methano-3-benzazocine-8-ol*

A solution of 5.2 g. of 1,2,3,4,5,6-hexahydro-6-phenyl-2,6-methano-3-benzazocine-8-ol and 0.84 g. of cyanamide in 50 ml. of anhydrous dimethylformamide is heated at 100° C. for 24 hours. The solvent is then removed in vacuo and the residue purified by recrystallization from methanol to yield 3-guanyl-1,2,3,4,5,6-hexahydro-6-phenyl-2,6-methano-3-benzazocine-8-ol.

The hydrochloride salt of the above mentioned compound is obtained when 2.16 g. of S-methylisothiourea hydrochloride is substituted for cyanamide in this procedure.

EXAMPLE 14

*1,2,3,4,5,6-hexahydro-8-methoxy-3-(N-methylguanyl)-6-phenyl-2,6-methano-3-benzazocine hydrochloride*

A mixture of 3.05 g. of 3-cyano-1,2,3,4,5,6-hexahydro-8-methoxy-6-phenyl-2,6-methano-3-benzazocine and 0.67 g. of methylamine hydrochloride is heated until it has fused into a clear liquid. This liquid is cooled and recrystallized from methanol to yield the hydrochloride salt of 1,2,3,4,5,6-hexahydro-8-methoxy-3-(N-methylguanyl)-6-phenyl-2,6-methano-3-benzazocine.

EXAMPLE 15

*3-(N,N - dimethylguanyl) - 1,2,3,4,5,6 - hexahydro - 8-methoxy - 6 - phenyl - 2,6 - methano - 3 - benzazocine hydrochloride*

Dimethylamine hydrochloride (0.81 g.) is employed in place of methylamine hydrochloride in the procedure of Example 14 and there is thus obtained the hydrochloride salt of 3-(N,N-dimethylguanyl)-1,2,3,4,5,6-hexahydro-8-methoxy-6-phenyl-2,6-methano-3-benzazocine.

EXAMPLE 16

*1,2,3,4,5,6-hexahydro - 8 - (methylthioiminocarbonyl)-6-phenyl-2,6-methano-3-benzazocine-8-ol-hydriodide*

To a solution of 5.0 g. of 1,2,3,4,5,6-hexahydro-6-phenyl-3-thiocarbamyl - 2,6-methano-3-benzazocine-8-ol in 50 ml. of anhydrous dimethylformamide is added 3.0 ml. of methyl iodide. The mixture is heated at 50° C. for two hours. The solvent is removed in vacuo and the residue recrystallized from isopropanol. There is thus obtained 1,2,3,4,5,6 - hexahydro - 6 - phenyl-3-(methylthioimimocarbonyl)-2,6-methano-3-benzazocine-8-ol hydriodide.

EXAMPLE 17

*Allyl-1,2,3,4,5,6-hexahydro-8-methoxy-6-phenyl-2,6-methano-3-benzazocine-3-thiolcarbonate*

A dispersion of sodium in xylene (15 ml., 0.10 mole) is added to a solution of 27.7 g. of 1,2,3,4,5,6-hexahydro-8-methoxy-6-phenyl-2,6-methano-3-benzazocine in 250 ml. of ethylene glycol dimethyl ether. Carbonyl sulfide (8 g., 0.13 mole) is then introduced beneath the surface of the well-stirred mixture, the temperature being allowed to rise by the heat of reaction. Allyl bromide (12.1 g., 0.10 mole) is next added to the reaction mixture over a 10 minute interval at 60° C. The mixture is then refluxed for 30 minutes, cooled and filtered, the filter cake being washed with benzene. The organic layer is then evaporated to yield allyl 1,2,3,4,5,6-hexahydro-8-methoxy-6-phenyl-2,6-methano-3-benzazocine-3-thiolcarbonate.

EXAMPLE 18

*3-(ethoxythiacarbonyl)-1,2,3,4,5,6-hexahydro-8-methoxy-6-phenyl-2,6-methano-3-benzazocine*

A solution of 2.79 g. of 1,2,3,4,5,6-hexahydro-8-methoxy-6-phenyl-2,6-methano-3-benzazocine and 1.80 g. of ethylxanthogenacetic acid in 25 ml. of benzene is refluxed for six hours, cooled, washed with dilute aqueous sodium hydroxide, dried over sodium sulfate and concentrated to yield 3 - (ethoxythiocarbonyl) - 1,2,3,4,5,6-hexahydro-8-methoxy-6-phenyl-2,6-methano-3-benzazocine.

EXAMPLE 19

*Ethyl-1,2,3,4,5,6-hexahydro-8-methoxy-6-phenyl-2,6-methano-3-benzazocine-3-carbodithioate*

A mixture of 8.2 g. of carbon disulfide and a cold solution of 4.3 g. of sodium hydroxide in 10 ml. of 50% aqueous ethanol is stirred and cooled to 0–5° C. A solution of 26.5 g. 1,2,3,4,5,6-hexahydro-8-methoxy-6-phenyl-2,6-methano-3-benzazocine in 100 ml. of ethanol is then added over a 30 minute interval with stirring and cooling. The stirring is continued for two hours and the mixture is then diluted with water. The product is recovered by filtration to give sodium 1,2,3,4,5,6-hexahydro-8-methoxy-6-phenyl-2,6-methano-3-benzazocine-3-carbodithioic acid. A mixture of 3.75 g. of this product, 1.8 g. of ethyl iodide and 20 ml. of 95% ethanol is refluxed for two hours. Thirty milliliters of water and benzene (50 ml.) are then added, the layers separated and the organic phase dried over sodium sulfate. Evaporation of the dried organic solution then yields ethyl 1,2,3,4,5,6-hexahydro-8-methoxy-6-phenyl-2,6-methano-3-benzazocine - 3 - carbodithioate.

EXAMPLE 20

*3-carbamyl-6-(p-chlorophenyl)-1,2,3,4,5,6-hexahydro-2,6-methano-3-benzazocine-8-ol*

(a) *1 - methyl - 4-(p-chlorophenyl)-1,2,5,6-tetrahydropyridine.*—A mixture of 3.00 g. of 4-(p-chlorophenyl)-1,2,5,6-tetrahydropyridine, 2.36 g. of sodium acetate, 7.9 ml. of 37% formaldehyde solution and 3.62 g. of 91% formic acid is heated at steam bath temperature for two hours with stirring. The mixture is then cooled and poured into 50 ml. of an ice-water mixture. After rendering the solution strongly alkaline by the addition of concentrated aqueous ammonia, it is extracted with ethyl ether. The extracts are then washed with water and dried over sodium sulfate. Upon evaporation of the solvent, there is obtained 1-methyl-4-(p-chlorophenyl)-1,2,5,6-tetrahydropyridine, M.P. 90–91° C., which may be further purified by recrystallization from either isopropyl ether or petroleum ether.

(b) *1 - methyl - 1 - (p - methoxybenzyl) - 4- (p-chlorophenyl) - 1,2,5,6 - tetrahydropyridinium chloride.*—To a solution of 9.66 g. of 1-methyl-4-(p-chlorophenyl)-1,2,5,6-tetrahydropyridine in 30 ml. of acetone is added 9.12 g. of p-methoxybenzyl chloride dissolved in 10 ml. of acetone. The solution is stirred at reflux for one-half an hour, cooled and filtered. The quaternary salt thus obtained demonstrates a melting point of 194–195.5° C.

(c) *1 - methyl - 2 - (p - methoxybenzyl) - 4 - (p - chlorophenyl)-1,2,5,6-tetrahydropyridine hydrobromide.*—To 3.30 g. of freshly dried (80°/.1 mm.) 1-methyl-1-(p-methoxybenzyl) - 4 - (p - chlorophenyl) - 1,2,5,6-tetrahydropyridinium chloride slurried in 50 ml. anhydrous ether are added 5.50 ml. of 2.00 N phenyl lithium under dry nitrogen free of oxygen. The mixture is refluxed for two hours under nitrogen. The cooled mixture is then poured into 50 g. of ice-water and the resultant ether phase extracted three times with 50 ml. portions of 2 N hydrochloric acid. The oily hydrochloride phase so obtained is rendered basic by addition of concentrated aqueous ammonia and extracted with ethyl ether. The ethereal extracts are washed once with water, dried over magnesium sulfate with clarification and evaporated. The oil thus obtained is dissolved in acetone and treated with hydrogen bromide gas until acid to congo red indicator. An equal volume of ether is added and the solution cooled. The solid thus formed is collected by filtration to yield 1-methyl - 2 - (p - methoxybenzyl) - 4 - (p - chlorophenyl)-1,2,5,6-tetrahydropyridine hydrobromide, M.P. 172–178° C. Upon further recrystallizations from 1:1:3 ethanol:acetone:ether, the material demonstrates a melting point of 181–182° C.

Calc. for $C_{20}H_{22}ClNO \cdot HBr$: C, 58.76; H, 5.67; Br, 19.55.

Found: C, 58.81; H, 5.62; Br, 19.42, 19.68.

(d) *6 - (p-chlorophenyl) - 1,2,3,4,5,6 - hexahydro - 3-methyl-2,6-methano-3-benzazocine-8-ol.*—A mixture of 8.72 g. of 1 - methyl-2-(p-methoxybenzyl)-4-(p-chlorophenyl)-1,2,5,6-tetrahydropyridine hydrobromide and 131 ml. of 48% hydrobromic acid is refluxed for 19 hours with rapid stirring. The hot solution is cautiously poured into a mixture of 140 ml. of cold concentrated aqueous ammonia and ice. After one-half an hour, the alkaline mixture is filtered and the solid dissolved in methanol and clarified with carbon. The methanol solution is then concentrated to about one-third its original volume and the solid collected and dried to yield 6-(p-chlorophenyl)-1,2,3,4,5,6-hexahydro-3-methyl-2,6-methano-3 - benzazocine-8-ol, M.P. 272–274° C.

Calc. for $C_{19}H_{20}ClNO$ (313.82): C, 72.73; H, 6.45; Cl, 11.30.

Found: C, 72.40; H, 6.36; Cl, 11.40.

(e) *8- acetoxy - 6 - (p - chlorophenyl) - 1,2,3,4,5,6-hexahydro-3-methyl-2,6-methano-3-benzazocine.*—A solution of 1.02 g. of 6-(p-chlorophenyl)-1,2,3,4,5,6-hexahydro-3-methyl-2,6-methano-3-benzazocine-8-ol in 7.00 ml. of acetic anhydride is heated for one hour at 100° C., poured into 30 ml. of cold water and rendered basic by the addition of 50% aqueous potassium hydroxide solution. The mixture is quickly extracted with ether, dried and concentrated. The residue is crystallized from isopropyl ether-petroleum ether (2:1) to yield 8-acetoxy-6-(p-chlorophenyl)-1,2,3,4,5,6-hexahydro-3-methyl - 2,6 - methano-3-benzazocine, M.P. 113–114° C. Further recrystallization raises the melting point to 115–117° C.

Calc. for $C_{21}H_{22}ClNO_2$ (355.85): C, 70.88; H, 6.23; Cl, 9.96.

Found: C, 70.60; H, 6.10; Cl, 10.11, 9.91.

(f) *8 - acetoxy-3-cyano-6-(p-chlorophenyl)-1,2,3,4,5,6-hexahydro - 2,6 - methano-3-benzazocine.*—A solution of 3.00 g. of 8-acetoxy-6-(p-chlorophenyl)-1,2,3,4,5,6-hexahydro-3-methyl-2,6-methano-3-benzazocine in 80 ml. of chloroform is added over a one hour interval to a solution of 1.07 g. of cyanogen bromide in 40 ml. of chloroform. The solution is then refluxed for three hours and evaporated to dryness in vacuo. Trituration of the residue with 25 ml. of ethanol yields 8-acetoxy-3-cyano-6-(p-chlorophenyl)-1,2,3,4,5,6-hexahydro-2,6-methano-3-benzazocine, M.P. 168-170° C. The melting point remains unchanged upon recrystallization from ethanol.

Calc. for $C_{21}H_{19}ClN_2O_2$: C, 68.76; H, 5.22; N, 7.63; Cl, 9.67.

Found: C, 68.64; H, 5.27; N, 7.82; Cl, 9.56.

(g) *3 - carbamyl - 6-(p-chlorophenyl)-1,2,3,4,5,6-hexahydro - 2,6 - methano-3-benzazocine-8-ol.*—A mixture of 2.40 g. of 8-acetoxy-3-cyano-6-(p-chlorophenyl)-1,2,3,4,5,6-hexahydro-2,6-methano-3-benzazocine, 2.34 ml. of 30% hydrogen peroxide and 40 ml. of ethanol is stirred while 1.36 ml. of 6 N sodium hydroxide are slowly added at room temperature. An exothermic reaction occurs and the temperature rises about 15° C. The solution is then heated at 55° C. for three hours and finally concentrated in vacuo to a small volume. Water is added and the precipitated solid is collected, dried and recrystallized from ethyl acetate to give 3-carbamyl-6-(p-chlorophenyl)-1,2,3,4,5,6 - hexahydro - 2,6 - methano - 3 - benzazocine-8-ol, M.P. 170–177° C.

Calc. for $C_{19}H_{19}ClN_2O_2$: C, 66.56; H, 5.58; N, 8.17; Cl, 10.34.

Found: C, 66.24; H, 5.62; N, 8.03; Cl, 10.06.

EXAMPLE 21

*8-acetoxy-3-carbethoxy-6-(p-chlorophenyl)-1,2,3,4,5,6-hexahydro-2,6-methano-3-benzazocine*

A solution of 1.5 g. of 8-acetoxy-6-(p-chlorophenyl)-1,2,3,4,5,6-hexahydro-2,6-methano - 3 - benzazocine in 50 ml. of anhydrous benzene is treated with a benzene solution of 1.5 g. of ethyl chloroformate in the manner of Example 3(a). There is thus obtained 8-acetoxy-3-carbethoxy-6-(p-chlorophenyl) - 1,2,3,4,5,6 - hexahydro - 2,6-methano-3-benzazocine.

EXAMPLE 22

*3-carbethoxy-6-(3',4'-dimethoxyphenyl)-1,2,3,4,5,6-hexahydro-8-methoxy-2,6-methano-3-benzazocine*

(a) *6 - (3,4 - dimethoxyphenyl)-1,2,3,4,5,6-hexahydro-8 - methoxy-3-methyl-2,6-methano-3-benzazocine.*—A solution of 76.5 g. (0.675 mole) of N-methyl-4-piperidone in 100 ml. of anhydrous ether is slowly added with stirring to a cooled solution of 183 g. (0.76 mole) of 3,4-dimethoxyphenyl magnesium bromide in 1 l. of anhydrous ether. Upon completion of the addition, the mixture is stirred for two hours at room temperature and then cooled in an ice bath. The unreacted Grignard reagent is decomposed by the careful addition of water after which is added 2.5 moles of hydrochloric acid diluted to 10% with water. The mixture is shaken and the aqueous layer then separated and rendered alkaline by the addition of aqueous ammonia. The aqueous mixture is extracted with chloroform and the chloroform extracts evaporated to a residue. This residue is dissolved in concentrated hydrochloric acid and the resulting solution then refluxed for two hours with stirring. The solution is cooled and poured into an ice cold aqueous excess of sodium hydroxide. This mixture is extracted with chloroform and the chloroform extracts then dried over sodium sulfate and evaporated. The residue is distilled in vacuo to yield the intermediate product 1-methyl-4-(3,4-dimethoxyphenyl)-1,2,5,6-tetrahydropyridine.

By substituting a molar equivalent amount of 1-methyl-4-(3,4-dimethoxyphenyl)-1,2,5,6-tetrahydropyridine for 1- methyl-4-phenyl-1,2,5,6-tetrahydropyridine in the procedure of Example 1, parts (b) and (c) there is obtained the intermediate 1 - methyl - 2 - (4-methoxybenzyl)-4-(3,4-dimethoxyphenyl) - 1,2,5,6 - tetrahydropyridine. This compound as the hydrochloride salt is cyclized with aluminum tribromide according to the alternative procedure of Example 12(a) to yield 6-(3,4-dimethoxyphenyl)-1,2,3,4,5,6-hexahydro -8- methoxy - 3-methyl-2,6-methano-3-benzazocine.

(b) *3 - carbethoxy-6-(3,4-dimethoxyphenyl)-1,2,3,4,5, 6 - hexahydro-8-methoxy-2,6-methano-3-benzazocine.*— A solution of 5 ml. of ethyl chloroformate in 35 ml. of toluene is added slowly to a solution of 10.0 g. of 6-(3,4-dimethoxyphenyl) - 1,2,3,4,5,6 - hexahydro - 8 - methoxy-3-methyl-2,6-methano-3-benzazocine in 50 ml. of toluene. The solution is then refluxed for six hours, cooled, diluted with chloroform, filtered and washed with dilute aqueous hydrochloric acid. After drying over anhydrous sodium sulfate, the solution is evaporated to yield 3-carbethoxy - 6-(3,4-dimethoxyphenyl)-1,2,3,4,5,6-hexahydro-8-methoxy-2,6-methano-3-benzazocine.

EXAMPLE 23

*3-carbethoxy-1,2,3,4,5,6-hexahydro-6-(β-methoxyethyl)-2,6-methano-3-benzazocine*

A solution of 5 ml. of ethyl chloroformate in 35 ml. of toluene is added under nitrogen with stirring to a solution of 10.35 g. of 1,2,3,4,5,6-hexahydro-3-methyl-6-(β-methoxyethyl)-2,6-methano-3-benzazocine in 35 ml. of toluene. The solution is refluxed for six hours, cooled, filtered and the filtrate evaporated. The residue is dissolved in methylene chloride, washed with 1 N hydrochloric acid, dried over sodium sulfate and evaporated to yield 3-carbethoxy-1,2,3,4,5,6 - hexahydro - 6 - (β - methoxyethyl)-2,6-methano-3-benzazocine.

The requisite 1,2,3,4,5,6-hexahydro-6-(β-methoxyethyl)-3-methyl-2,6-methano-3-benzazocine is obtained as follows:

Methyl iodide (313 g., 137 ml.) is added dropwise with stirring to a solution of 274 g. of 4-(β-methoxyethyl)-pyridine in 400 ml. of acetone and 200 ml. of benzene at such a rate so as to maintain reflux. The stirring is continued for three hours while the reaction mixture is allowed to cool to room temperature. After refrigeration overnight the product is collected and dried to yield 4-(β-methoxyethyl)-pyridine methiodide, M.P. 74–78° C.

A solution of 223 g. (0.80 mole) of 4-(β-methoxyethyl)-pyridine methiodide in 320 ml. of water and 320 ml. of methanol is added dropwise with stirring to a solution of 50 g. (1.3 mole) of sodium borohydride in 240 ml. of water at such a rate so that the temperature is maintained at 50–60° C. (two hours required). Additional solid sodium borohydride (44 g.) is then added and stirring at room temperature is continued for 15 hours. At the end of this time, the solution is filtered and concentrated in vacuo to about one-third its original volume. The solution is then extracted with ether several times. These extracts are washed with saturated aqueous sodium sulfate, dried over sodium sulfate, evaporated and the residue distilled to yield 1-methyl-4-(β-methoxyethyl)-1,2,5,6-tetrahydropyridine, B.P. 90–92° C./12 mm.

A 10% mole excess of benzyl chloride is added to a solution of 7.8 g. of 1-methyl-4-(β-methoxyethyl)-1,2,5,6-tetrahydropyridine in 30 ml. of acetone. After standing at room temperature the product crystallizes and is collected to yield 1-benzyl-1-methyl-4-(β-methoxyethyl)-1,2,5,6-tetrahydropyridinium chloride, M.P. 128–132° C. Recrystallization from acetone raises the melting point to 134.5–137.5° C. The compound is very hygroscopic.

A 2.0 molar solution of phenyl lithium in ether (72.5 ml., 0.143 mole) is added dropwise to a stirred suspension of dry (60–80°/5 mm., one hour) 1 benzyl-1-methyl - 4 - (β - methoxyethyl)-1,2,5,6-tetrahydropyridinium chloride (35.8 g., 0.127 mole) in 225 ml. of anhydrous ether at such a rate so as to maintain a gentle reflux. Refluxing is continued for two hours and then the reaction mixture is cooled and rendered acidic with about 100 ml. of 2 N hydrochloric acid. The aqueous layer is separated and rendered basic with conc. ammonium hydroxide, again with ice cooling. The product is extracted into ether, and the extract dried over sodium sulfate and evaporated. The residue is distilled to yield 2-benzyl-4 - (β - methoxyethyl)-1-methyl-1,2,5,6-tetrahydropyridine, B. P. 128–135° C./.5 mm.

A solution of the soluble portion of 12.0 g. of aluminum tribromide in 20 ml. of carbon disulfide is added over a ten minute interval to a solution of 3.0 g. of freshly distilled 2-benzyl-4-(β-methoxyethyl)-1-methyl-1,2,5,6-tetrahydropyridine in 20 ml. of carbon disulfide with stirring and cooling in ice. After five minutes the cooling bath is removed and the mixture heated at reflux for 30 minutes. The mixture is then cooled, the solution decanted and the residue washed with carbon disulfide. The viscous residue is then poured over ice and 20 ml. of conc. aqueous ammonia are added. Chloroform is added and the mixture stirred and heated to melt the ice and warm the mixture. The solids are removed by filtration and washed well with chloroform. The chloroform layer is separated, dried over sodium sulfate and evaporated. The residual oil is distilled at 130° C./.05 mm. to yield 1,2,3,4,5,6-hexahydro-6-(β-methoxyethyl)-3-methyl-2,6-methano-3-benzazocine.

The hydrochloride melts at 163–165° C. after two recrystallizations from acetone.

EXAMPLE 24

*3-carbamyl-1,2,3,4,5,6-hexahydro-6-(β-methoxyethyl)-2,6-methano-3-benzazocine-8-ol*

(a) *1,2,3,4,5,6 - hexahydro - 6 - (β - methoxyethyl)-3-methyl-2,6-methano-3-benzazocine-8-ol.*—To a solution of 5.33 g. (0.022 mole) of 1,2,3,4,5,6-hexahydro-6-(β-methoxyethyl)-3-methyl-2,6-methano-3-benzazocine in 20 ml. of glacial acetic acid, shilled to −10° C., is added a mixture of 20 ml. fuming nitric acid (90%) and 15 ml. of glacial acetic acid, also cooled to −10° C. The reaction mixture is stirred vigorously so as to maintain the temperature at below 5° C. The solution is then allowed to stand at room temperature for 63 hours and then poured into 400 ml. of water. The acidic aqueous solution is extracted with 25 ml. of methylene chloride. The extracted solution is rendered basic with aqueous sodium hydroxide solution and again extracted three times with methylene chloride. These organic extracts are combined, dried over magnesium sulfate and concentrated, to yield an oil which upon treatment with picric acid in ethanol, produces a yellow picrate, M.P. 212.5° C. This picrate is dissolved in methylene chloride and the resulting solution shaken with excess 5% aqueous lithium hydroxide solution. The organic solution is separated, dried over magnesium sulfate and concentrated to give the light tan oil, 1.96 g. of which are then dissolved in a mixture of 80 ml. of 95% ethanol and 10 ml. of hydrazine hydrate. To the solution is added a small amount of freshly prepared Raney nickel. The solution is heated on the steam bath for 30 minutes. The solution is then filtered and concentrated. This residue is dissolved in 50 ml. of 3 N sulfuric acid and the solution cooled to 0° C. One-half gram of sodium nitrite is gradually added. The temperature is maintained at 0° C. for 30 minutes and the mixture then poured into a warm mixture of 40 ml. of sulfuric acid and 40 ml. of water. This solution is heated for 30 minutes on a steam bath, chilled and neutralized with concentrated ammonium hydroxide solution. The mixture is extracted three times with methylene chloride and the combined extracts then dried over magnesium sulfate and concentrated. The residue is dissolved in acetone and the solution chromatographed on a short column of alumina. The solvent is removed and the residual tan solid recrystallized from toluene-petroleum ether to yield 1,2,3,4,5,6-hexahydro-6-($\beta$-methoxyethyl)-3-methyl - 2,6-methano-3-benzazocine-8-ol, M.P. 155–159° C. (dec.).

(b) *8 - acetoxy - 1,2,3,4,5,6 - hexahydro - 6 - ($\beta$-methoxyethyl) - 3 - methyl - 2,6 - methano - 3 - benzazocine.*—A solution of 1.0 g. of 1,2,3,4,5,6-hexahydro-6 - ($\beta$ - methoxyethyl) - 3 - methyl - 2,6 - methano - 3-benzazocine-8-ol in 7.0 ml. of acetic anhydride is heated for one hour at 100° C., cooled, poured into 30 ml. of cold water and rendered alkaline by the addition of cold 50% aqueous potassium hydroxide solution. The mixture is then quickly extracted with ether and these extracts, dried over anhydrous sodium sulfate and evaporated to yield 8 - acetoxy - 1,2,3,4,5,6-hexahydro - 6 - ($\beta$ - methoxyethyl)-3-methyl-2,6-methano-3-benzazocine.

In like manner by employing the appropriate intermediate there is prepared $\alpha$-8-acetoxy-3,6-dimethyl-11-ethyl-1,2,3,4,5,6 - hexahydro - 2,6 methano - 3 - benzazocine; $\beta$ - 8 - acetoxy - 3,6 - dimethyl - 11 - ethyl - 1,2,3,4,5,6-hexahydro-2,6-methano-3-benzazocine and 8-acetoxy-6-isopropyl - 1,2,3,4,5,6 - hexahydro - 3 - methyl - 2,6-methano-3-benzazocine.

(c) *3 - carbamyl - 1,2,3,4,5,6 - hexahydro - 6 - ($\beta$-methoxyethyl) - 2,6 - methano - 3 - benzazocine - 8 - ol.*—8 - acetoxy - 1,2,3,4,5,6 - hexahydro - 6 - ($\beta$ - methoxyethyl)-3-methyl-2,6-methano-3-benzazocine is treated with cyanogen bromide according to the procedure of part (f) of Example 1 to obtain 8 - acetoxy - 3 - cyano - 1,2,3,4,5,6 - hexahydro - 6 - ($\beta$ - methoxyethyl) - 2,6 - methano-3-benzazocine. This intermediate is then converted to 3-carbamyl - 1,2,3,4,5,6 - hexahydro - 6 - ($\beta$ - methoxyethyl) - 2,6 - methano - 3 - benzazocine - 8 - ol by following the procedure of Example 2. In a similar fashion, 1,2,3,4,5,6 - hexahydro - 6 - ($\beta$ - methoxyethyl) - 3-methyl-2,6-methano-3-benzazocine is converted to the corresponding 2-cyano compound which upon treatment in the manner of Example 2 yields 3 - carbamyl-1,2,3,4,5,6 - hexahydro - 6 - ($\beta$ - methoxyethyl) - 2,6-methano-3-benzazocine, M.P. 141–142° C.

In a similar fashion, $\alpha$-8-acetoxy-3,6-dimethyl-11-ethyl-1,2,3,4,5,6 - hexahydro - 2,6 - methano - 3 - benzazocine; $\beta$ - 8 - acetoxy - 3,6 - dimethyl - 11 - ethyl - 1,2,3,4,5,6-hexahydro - 2,6 - methano - 3 - benzazocine and 8 - acetoxy - 6 - isopropyl - 1,2,3,4,5,6 - hexahydro - 3 - methyl-2,6-methano-3-benzazocine are respectively converted to $\alpha$ - 8 - acetoxy - 3 - cyano - 11 - ethyl - 1,2,3,4,5,6 - hexahydro - 6 - methyl - 2,6 - methano - 3 - benzazocine; $\beta$-8 - acetoxy - 3 - cyano - 11 - ethyl - 1,2,3,4,5,6 - hexahydro - 6 - methyl - 2,6 - methano - 3 - benzazocine; and 8 - acetoxy - 3 - cyano - 1,2,3,4,5,6 - hexahydro - 6 - isopropyl - 2,6 - methano - 3 - benzazocine, which in turn are respectively converted to $a$-3-carbamyl-11-ethyl-1,2,3,4,5,6 - hexahydro - 6 - methyl - 2,6 - methano - 3 - benzazocine - 8 - ol; $\beta$ - 3 - carbamyl - 11 - ethyl - 1,2,3,4,5,6 - hexahydro - 6 - methyl - 2,6 - methano - 3 - benzazocine - 8 - ol and 3 - carbamyl - 1,2,3,4,5,6 - hexahydro-6-isopropyl-2,6-methano-3-benzazocine-8-ol.

The $\alpha$ and $\beta$ forms of the above requisite intermediates 3,6 - dimethyl - 11 - ethyl - 1,2,3,4,5,6 - hexahydro - 2,6-methano-3-benzazocine-8-ol are known. The requisite 1,2,3,4,5,6 - hexahydro - 6 - isopropyl - 3 - methyl - 2,6-methano-3-benzazocine-8-ol is prepared as follows:

To a solution of 24.20 g. (0.20 mole) of distilled 4-isopropylpyridine in 50 ml. of acetone are added 15 ml. of methyliodide. The reaction is exothermic and the methiodide crystallizes within one hour. The mixture is stirred a total of two hours, filtered and washed with cold acetone. The product is recrystallized from acetone to to yield 4-isopropylpyridine methiodide, M.P. 123–130° C., which should be stored under nitrogen in a brown bottle.

p-Methoxybenzyl magnesium chloride is prepared from 32.9 g. (0.211 mole) of p-methoxybenzylchloride and 0.5 mole each of magnesium powder and magnesium turnings in 225 ml. of anhydrous ether.

To a suspension of 44.10 g. of 4-isopropylpyridine methiodide in 150 ml. ether is added the filtered (through glass wool) p-methoxybenzyl magnesium chloride. The mixture is refluxed for two hours, after which it is poured with vigorous stirring into ice water containing 22 g. of ammonium chloride. After addition of a little aqueous ammonia, the ethereal layer is extracted three times with 100 ml. portions of 2 N hydrochloric acid. These acid extracts are rendered alkaline by the addition of cold aqueous ammonia and the liberated base dried in ether. Evaporation of the ether yields crude 1-methyl-2-(p-methoxybenzyl)-4-isopropyl-1,2-dihydropyridine. This material is dissolved in 110 ml. of methanol and 50 ml. of 1 N sodium hydroxide and then added to a solution of 21 ml. of 1 N sodium hydroxide and 4.75 g. (.125 mole) of sodium borohydride. The reaction mixture is maintained at 65±5° C. for one hour, then concentrated in vacuo to remove methanol. Two hundred milliliters of water are added and the aqueous phase is extracted three times with ether (3 x 75 ml.). Evaporation of the dried ethereal extracts yields the impure 4-isopropyl-1-methyl-2-(p-methoxybenzyl) - 1,2,5,6 - tetrahydropyridine which is further purified by repeated fractional distillation, B.P. 101–102° C./0.6 mm.

A mixture of 9.95 g. (38.2 m. mole) of 4-isopropyl-1-methyl - 2 - (p - methoxybenzyl) - 1,2,5,6 - tetrahydropyridine and 100 ml. of 48% hydrobromic acid is heated at 150° C. for 24 hours. The gummy mixture is then poured into ice cooled water and rendered basic by the addition of concentrated ammonium hydroxide solution. The solid formed is collected, washed with water and dried in a vacuum desiccator at room temperature to constant weight. This material is chromatographed on a silica gel column using 80:15:5 n-butanol:conc. ammonium hydroxide: benzene as eluant. The material, melting at 235.5–237.5° C., is then recrystallized twice from ethyl acetate with clarification to yield 1,2,3,4,5,6-hexahydro-6 - isopropyl - 3 - methyl - 2,6 - methano - 3 - benzazocine-8-ol, M.P. 240.0–242.5° C.

EXAMPLE 25

*3-carbamyl-1,2,3,4,5,6-hexahydro-11-methyl-6-phenyl-2,6-methano-3-benzazocine-8-ol*

(a) *8-acetoxy - 3,11-dimethyl - 1,2,3,4,5,6-hexahydro-6-phenyl - 2,6 - methano-3-benzazocine.*—By employing a molar equivalent amount of 1,3-dimethyl-4-phenyl-1,2,5,6-tetrahydropyridine in place of 1 - methyl-4-phenyl-1,2,5,6-tetrahydropyridine in the procedure of Example 1, parts (a–e), there is obtained predominantly the cis isomer of 8-acetoxy-3,11-dimethyl - 1,2,3,4,5,6-hexahydro-2,6-methano-3-benzazocine. The cis isomer is separated from the minor component of the trans isomer by fractional crystallization of the hydrochloride salts from methanol-acetone with the trans isomer being recovered from the mother liquors.

The trans isomer is prepared in larger proportions by cyclizing the hydrochloride salt of 1,3 - dimethyl-2-(4-methoxybenzyl)-4-phenyl - 1,2,5,6 - tetrahydropyridine with aluminum tribromide according to the alternative procedure of Example 12 to yield 3,11-dimethyl-1,2,3,4,5,6 - hexahydro-8-methoxy-6-phenyl - 2,6 - methano-3-benzazocine which may be demethylated and esterified as herein described to yield the corresponding 8-acetoxy compound.

(b) *3-carbamyl - 1,2,3,4,5,6 - hexahydro-11-methyl-6-phenyl-2,6-methano - 3 - benzazocine - 8 - ol.*—By separately substituting the cis and trans form of 8-acetoxy-3,11 - dimethyl - 1,2,3,4,5,6 - hexahydro-6-phenyl-2,6-methano-3-benzazocine in the alternative procedure of Example 2 and following the procedure therein set forth, there are respectively obtained the cis and trans forms of 3-carbamyl - 1,2,3,4,5,6-hexahydro - 11 - methyl-6-phenyl-2,6-methano-3-benzazocine-8-ol.

EXAMPLE 26

*Resolution of 3-carbamyl-1,2,3,4,5,6-hexahydro-6-phenyl-2,6-methano-3-benzazocine-8-ol*

1,2,3,4,5,6-hexahydro - 3 - methyl - 5 - phenyl-2,6-methano-3-benzazocine-8-ol (3.96 g.) and 4.4 g. of d-camphorsulfonic acid are suspended in boiling acetone and sufficient methanol is added to effect dissolution. The solution is then allowed to cool and the salt which forms is collected by filtration, dried and recrystallized from methanol-acetone (M.P. 241–247° C., $[\alpha]_D^{25} = +120°$, C=0.5, methanol). The salt is then suspended in excess 10% aqueous ammonium hydroxide and the solid which forms is collected and dried to yield the dextrorotatory base, M.P. 254–259°, $[\alpha]_D^{25} = +173°$, C=0.52, methanol.

The levorotatory base is recovered from the mother liquid of the original solution by concentration and purified via formation of the salt with d-tartaric acid.

Each of the two isomers are acetylated according to tthe procedure of Example 9 and the two acetates thus obtained are subjected to the procedure of Example 2 to yield the dextrorotatory and levorotatory forms of 3-carbamyl - 1,2,3,4,5,6-hexahydro-6-phenyl - 2,6 - methano-3-benzazocine-8-ol.

EXAMPLE 27

*3-carbamyl-1,2,3,4,5,6-hexahydro-6-phenyl-2,6-methanol-3-benzazocine-8-ol-9-sulfonic acid*

A mixture of 2.0 g. of 3-carbamyl-1,2,3,4,5,6-hexahydro-6-phenyl - 2,6 - methano - 3 - benzazocine-8-ol and 10 ml. of concentrated sulfuric is heated until solution results. After 20 minutes of heating the solution is cautiously poured into 50 ml. of water and extracted several times with ethyl acetate. Evaporation of the dried organic extract yields 3-carbamyl-1,2,3,4,5,6-hexahydro-6-phenyl-2,6-methano-3-bezazocine-8-ol 9-sulfonic acid.

EXAMPLE 28

*3-carbamyl-1,2,3,4,5,6-hexahydro-8-(3-nicotinyloxy)-6-phenyl-2,6-methano-3-benzazocine*

A mixture of 2 g. of nicotinyl chloride hydrochloride, 2 g. of 3-carbamyl 1,2,3,4,5,6-hexahydro - 6 - phenyl-2,6-methano-3-benzazocine-8-ol and 15 ml. of pyridine is heated at 60°–80° C. for two hours. On evaporation in vacuo there is isolated a foam, which can be crystallized from benzene-cyclohexane to yield 3-carbamyl-1,2,3,4,5 - hexahydro - 8 - (3-nicotinyloxy)-6-phenyl-2,6-methano-3-benzazocine. When treated with ethanolic hydrochloric acid, there is isolated the crystalline salt.

EXAMPLE 29

*3-carbamyl-1,2,3,4,5,6-hexahydro-6-phenyl-2,6-methano-3-benzazocine-8-ol 8-hemisuccinate*

A mixture of 0.78 g. of succinic anhydride, 2.08 g. of 3-carbamyl-1,2,3,4,5,6 - hexahydro - 6 - phenyl - 2,6-methano-3-benzazocine-8-ol and 20 ml. of pyridine is heated at 100° C. for an hour, cooled and poured into 100 ml. of water containing 20 ml. of concentrated hydrochloric acid. The mixture is extracted with several portions of chloroform. The chloroform phase on evaporation yields a foam which crystallizes from tetrahydrofuran and toluene to yield 3-carbamyl-1,2,3,4,5,6-hexahydro-6-phenyl-2,6-methano-3-benzazocine-8-ol 8-hemisuccinate.

EXAMPLE 30

*3-carbamyl-1,2,3,4,5,6-hexahydro-6-phenyl-2,6-methano-3-benzazocine-8-ol 8-hemiphthalate*

A mixture of 1.0 g. of phthalic anhydride, 2.0 g. of 3-carbamyl-1,2,3,4,5,6-hexahydro - 6 - phenyl - 2,6-methano-3-benzazocine-8-ol ml. of pyridine is heated at 100° C. for an hour. It is cooled and poured into 100 ml. of water containing 20 ml. of concentrated hydrochloric acid. The mixture is extracted with several portions of chloroform. The chloroform phase on evaporation yields 3-carbamyl-1,2,3,4,5,6 - hexahydro - 6 - phenyl-2,6-methano-3-benzazocine-8-ol 8-hemiphthalate.

EXAMPLE 31

*3-carbamyl-8-(N,N-dimethylaminopropionoxy)-1,2,3,4,5,6-hexahydro-6-phenyl-2,6-methano-3-benzazocine*

The procedure of Example 28 is repeated, using 3-N,N-dimethylaminopropionyl chloride instead of nicotinyl chloride hydrochloride. There is obtained 3-carbamyl-8-(N,N-dimethylaminopropenoxy)-1,2,3,4,5,6 - hexahydro - 6-phenyl-2,6-methano-3-benzazocine hydrochloride.

EXAMPLE 32

*9 - dimethylaminomethyl - 3 - (N-butyl-N′,N′-dimethylaminoethylcarbamyl) - 1,2,3,4,5,6 - hexahydro - 6 - phenyl-2,5-methano-3-benzazocine-8-ol*

A mixture of 6 mmole of 2-(N-butyl-N′,N′-dimethylaminoethylcarbamyl) - 1,2,3,4,5,6 - hexahydro-6-phenyl-2,6-methano-3-benzazocine-8-ol hydrobromide 6 mmole of 30% formalin and 6.5 mmole of 25% aqueous dimethylamine solution was refluxed for two hours. The reaction is evaporated in vacuo and the residue treated with acetone to yield the desired product.

EXAMPLE 33

*3 - (N-butyl-N′,N′ - dimethylamino-ethylcarbamyl)-1,2,3,4,5,6 - hexahydro-6-phenyl-2,6-methano-3-benzazocine-8-ol*

To a solution of 3.0 g. of 1,2,3,4,5,6-hexahydro-8-methoxy-6-phenyl-2,6-methano-3-benzazocine in 50 ml. benzene cooled to 0° C. is added 1.8 g. of sodium bicarbonate and 10.0 ml. of 12.5% phosgene in benzene. The mixture is kept at 0° C. for half an hour and then refluxed for an hour. The mixture is treated with excess N′-butyl-N,N-dimethylethylenediamine and refluxed for three hours. The solution is evaporated in vacuo to yield 3 - (N - butyl-N′,N′-dimethylaminoethylcarbamyl)-1,2,3, 4,5,6 - hexahydro - 8 - methoxy-6-phenyl-2,6-methano-3-benzazocine as a foam. The foam is treated with 20 ml. of 32% hydrobromic acid in acetic acid for 24 hours at room temperature. On evaporation in vacuo there is isolated 3 - (N-butyl-N′,N′-dimethylaminoethylcarbamyl)-1, 2,3,4,5,6 - hexahydro - 6-phenyl-2,6-methano-3-benzazocine-8-ol hydrobromide which is recrystallized from ethanol-ether.

What is claimed is:

1. Compounds of the formula:

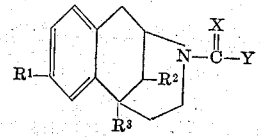

wherein

X is selected from the group consisting of O, S and NH;

Y is selected from the group consisting of OR⁴, SR⁵ and

in which:

each of R⁴ and R⁵ is selected from the group consisting of (lower)alkyl, (lower)alkenyl, phenyl and phenyl(lower)alkyl, and each of R⁶ and R⁷ is selected from the group consisting of hydrogen, (lower)alkyl, (lower) alkenyl, phenyl, (lower)alkylphenyl, (lower) alkoxyphenyl, chlorophenyl, bromophenyl, hydroxyphenyl, trifluoromethylphenyl, phenyl (lower)alkyl and when R⁶ and R⁷ are taken together alkylene of from 2 to 7 carbon atoms and ethyleneoxyethyl;

$R^1$ is selected from the group consisting of hydrogen, hydroxy, (lower)alkoxy and (lower)alkanoyloxy;

$R^2$ is selected from the group consisting of hydrogen and (lower)alkyl and $R^3$ is selected from the group consisting of hydrogen, (lower)alkyl, β-methoxyethyl and

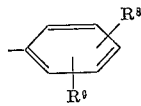

in which each of $R^8$ and $R^9$ is selected from the group consisting of hydrogen, halogen, (lower)alkyl, (lower)alkoxy, (lower)alkanoyloxy, hydroxy and trifluoromethyl.

2. Compounds according to claim 1 wherein X is O and Y is $OR^4$.

3. Compounds according to claim 1 wherein X is O and Y is $SR^5$.

4. Compounds according to claim 1 wherein X is O and Y is

5. Compounds according to claim 1 wherein X is S and Y is

6. Compounds according to claim 1 wherein X is NH and Y is $OR^4$.

7. Compounds according to claim 1 wherein X is NH and Y is

8. A compound of the formula:

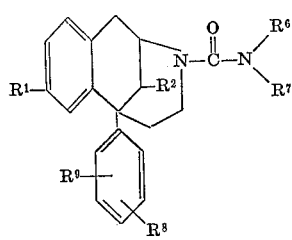

wherein
$R^1$ is selected from the group consisting of hydrogen, hydroxy, (lower)alkoxy and (lower)alkanoyloxy,
$R^2$ is selected from the group consisting of hydrogen and (lower)alkyl,
each of $R^6$ and $R^7$ is selected from the group consisting of hydrogen, (lower)alkyl, (lower)alkenyl, phenyl, (lower)alkylphenyl, (lower)alkoxyphenyl, chlorophenyl, bromophenyl, hydroxyphenyl, trifluoromethylphenyl, phenyl(lower)alkyl and when $R^6$ and $R^7$ are taken together alkylene of from 2 to 7 carbon atoms and ethyleneoxyethyl, and
each of $R^8$ and $R^9$ is selected from the group consisting of hydrogen, halogen, (lower)alkyl, (lower)alkoxy, (lower)alkanoyloxy, hydroxy and trifluoromethyl.

9. A compound of the formula:

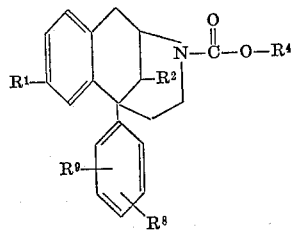

wherein
$R^1$ is selected from the group consisting of hydrogen, hydroxy, (lower)alkoxy and (lower)alkanoyloxy,
$R^2$ is selected from the group consisting of hydrogen and (lower)alkyl,
$R^4$ is selected from the group consisting of (lower)alkyl, (lower)alkenyl, phenyl and phenyl(lower)alkyl, and
each of $R^8$ and $R^9$ is selected from the group consisting of hydrogen, halogen, (lower)alkyl, (lower)alkoxy, (lower)alkanoyloxy, hydroxy and trifluoromethyl.

10. A compound of the formula:

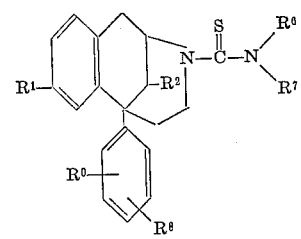

wherein
$R^1$ is selected from the group consisting of hydrogen, hydroxy, (lower)alkoxy and (lower)alkanoyloxy,
$R^2$ is selected from the group consisting of hydrogen and (lower)alkyl,
each of $R^6$ and $R^7$ is selected from the group consisting of hydrogen, (lower)alkyl, (lower)alkenyl, phenyl, (lower)alkylphenyl, (lower)alkoxyphenyl, chlorophenyl, bromophenyl, hydroxyphenyl, trifluoromethylphenyl, phenyl(lower)alkyl, and when $R^6$ and $R^7$ are taken toegther alkylene of from 2 to 7 carbon atoms and ethyleneoxyethyl, and
each of $R^8$ and $R^9$ is selected from the group consisting of hydrogen, halogen (lower)alkyl, (lower)alkoxy, (lower)alkanoyloxy, hydroxy and trifluoromethyl.

11. A compound of the formula:

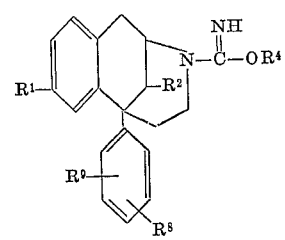

wherein:
$R^1$ is selected from the group consisting of hydrogen, hydroxy, (lower)alkoxy and (lower)alkanoyloxy,
$R^2$ is selected from the group consisting of hydrogen and (lower)alkyl,
$R^4$ is selected from the group consisting of (lower)alkyl, (lower)alkenyl, phenyl and phenyl(lower)-alkyl, and
each of $R^8$ and $R^9$ is selected from the group consisting of hydrogen, halogen, (lower)alkyl, (lower)alkoxy, (lower)alkanoyloxy, hydroxy and trifluoromethyl.

12. A compound of the formula:

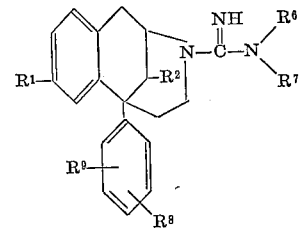

wherein
$R^1$ is selected from the group consisting of hydrogen, hydroxy, (lower)alkoxy and (lower)alkanoyloxy, R² is selected from the group consisting of hydrogen and (lower)alkyl, each of R⁶ and R⁷ is selected from the group consisting of hydrogen, (lower)alkyl, (lower)alkenyl, phenyl, (lower)alkylphenyl, (lower)alkoxyphenyl, chlorophenyl, bromophenyl, hydroxyphenyl, trifluoromethylphenyl, phenyl(lower)alkyl and when R⁶ and R⁷ are taken together alkylene of from 2 to 7 carbon atoms and ethyleneoxyethyl, and each of R⁸ and R⁹ is selected from the group consisting of hydrogen, halogen, (lower)alkyl, (lower)alkoxy, (lower)alkanoyloxy, hydroxy and trifluoromethyl.

13. A compound of the formula:

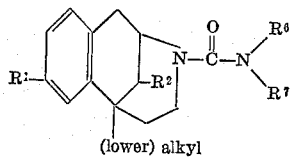

(lower) alkyl wherein

R¹ is selected from the group consisting of hydrogen, hydroxy, (lower)alkoxy and (lower)alkanoyloxy, R² is selected from the group consisting of hydrogen and (loweralkyl, and each of R⁶ and R⁷ is selected from the group consisting of hydrogen, (lower)alkyl, (lower)alkenyl, phenyl, (lower)alkylphenyl, (lower)alkoxyphenyl, chlorophenyl, bromophenyl, hydroxyphenyl, trifluoromethylphenyl, phenyl(lower)alkyl, and when R⁶ and R⁷ are taken together alkylene of from 2 to 7 carbon atoms and ethyleneoxyethyl.

14. A compound of the formula:

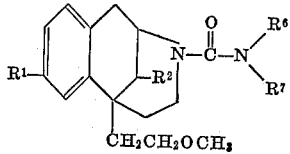

CH₂CH₂OCH₃ wherein

R¹ is selected from the group consisting of hydrogen, hydroxy, (lower)alkoxy and (lower)alkanoyloxy, R² is selected from the group consisting of hydrogen and (lower) alkyl, and each of R⁶ and R⁷ is selected from the group consisting of hydrogen (lower)alkyl, (lower)alkenyl, phenyl, (lower)alkylphenyl, (lower)alkoxyphenyl, chlorophenyl, bromophenyl, hydroxyphenyl, trifluoromethylphenyl, phenyl(lower)alkyl, and when R⁶ and R⁷ are taken together alkylene of from 1 to 7 carbon atoms and ethyleneoxyethyl.

15. 3 - Carbamyl - 1,2,3,4,5,6 - hexahydro - 6 - phenyl 2,6-methano-3-benzazocine-8-ol.

16. 3 - carbethoxy - 1,2,3,4,5,6 - hexahydro - 6 - phenyl- 2,6-methano-3-benzazocine-8-ol.

17. 3 - (N,N - Dimethylcarbamyl) - 1,2,3,4,5,6 - hexahydro-6-phenyl-2,6-methano-3-benzazocine-8-ol.

18. 1,2,3,4,5,6 - hexahydro - 6 - phenyl - 3 - (N - piperidinylcarbonyl)-2,6-methano-3-benzazocine-8-ol.

19. 1,2,3,4,5,6 - hexahydro - 3 - (N - morpholinocarbonyl)-6-phenyl-2,6-methano-3-benzazocine-8-ol.

20. 1,2,3,4,5,6 - hexahydro - 6 - phenyl - 3 - thiocarbamyl-2,6-methano-3-benzazocine-8-ol.

21. 1,2,3,4,5,6 - hexahydro - 3 - (N - methylthiocarbamyl)-6-phenyl-2,6-methano-3-benzazocine-8-ol.

22. 1,2,3,4,5,6 - hexahydro - 6 - phenyl - 3 - [N - (β-phenylethyl) - thiocarbamyl] - 2,6 - methano - 3 - benzazocine-8-ol.

23. (3 - (N - allylthiocarbamyl) - 1,2,3,4,5,6 - hexahydro-6-phenyl-2,6-methano-3-benzazocine-8-ol.

24. 1,2,3,4,5,6 - hexahydro - 3 - (N - methylcarbamyl)- 6-phenyl-2,6-methano-3-benzazocine-8-ol.

25. 1,2,3,4,5,6 - hexahydro - 6 - phenyl - 3 - (N - phenylcarbamyl)-2,6-methano-3-benzazocine-8-ol.

26. 3 - carbamyl - 6 - (p - chlorophenyl) - 1,2,3,4,5,6-hexahydro-2,6-methano-3-benzazocine-8-ol.

27. 3 carbethoxy - 1,2,3,4,5,6 - hexahydro - 6 - (β-methoxyethyl)-2,6-methano-3-benzazocine.

28. 3 - carbamyl - 1,2,3,4,5,6 - hexahydro - 6 - (β-methoxyethyl)-2,6-methano-3-benzazocine-8-ol.

29. 3 - carbamyl - 11 - ethyl - 1,2,3,4,5,6 - hexahydro - 6-methyl-2,6-methano-3-benzazocine-8-ol.

30. 3 - carbamyl - 1,2,3,4,5,6 - hexahydro - 6 - isopropyl-2,6-methano-3-benzazocine-8-ol.

31. 3 - carbamyl - 1,2,3,4,5,6 - hexahydro - 11 - methyl- 6-phenyl-2,6-methano-3-benzazocine-8-ol.

No references cited.

ALEX MAZEL, *Primary Examiner.*

J. TOVAR, *Assistant Examiner.*